US012595656B2

(12) United States Patent
Bartnik Johansson et al.

(10) Patent No.: US 12,595,656 B2
(45) Date of Patent: Apr. 7, 2026

(54) ACOUSTIC PRODUCTS

(71) Applicant: ROCKWOOL A/S, Hedehusene (DK)

(72) Inventors: Dorte Bartnik Johansson, Hedehusene (DK); Miroslav Nikolic, Hedehusene (DK)

(73) Assignee: Rockwool A/S, Hedehusene (DK)

(*) Notice: Subject to any disclaimer, the term of this patent is extended or adjusted under 35 U.S.C. 154(b) by 271 days.

(21) Appl. No.: 18/259,813

(22) PCT Filed: Oct. 1, 2021

(86) PCT No.: PCT/EP2021/077183
§ 371 (c)(1),
(2) Date: Jun. 29, 2023

(87) PCT Pub. No.: WO2022/144106
PCT Pub. Date: Jul. 7, 2022

(65) Prior Publication Data
US 2024/0060293 A1 Feb. 22, 2024

(30) Foreign Application Priority Data
Dec. 30, 2020 (WO) ................ PCT/EP2020/088061

(51) Int. Cl.
*E04B 1/86* (2006.01)
*B01J 20/24* (2006.01)
(Continued)

(52) U.S. Cl.
CPC ................ *E04B 1/86* (2013.01); *B01J 20/24* (2013.01); *B01J 20/28004* (2013.01);
(Continued)

(58) Field of Classification Search
CPC ... E04B 1/86; E04B 1/88; C08J 5/0405; B01J 20/24; B01J 20/280024; B01J 20/280023;
(Continued)

(56) References Cited

U.S. PATENT DOCUMENTS 3,093,604 A 6/1963 Ayers
3,285,801 A 11/1966 Sargent
(Continued)

FOREIGN PATENT DOCUMENTS

CA 2277286 7/1998
CN 2351274 12/1999
(Continued)

OTHER PUBLICATIONS

International Search Report/Written Opinion, PCT/EP2020/059653, mail date Dec. 9, 2020, PCT/ISA/210, PCT/ISA/220, PCT/ISA/237.
(Continued)

*Primary Examiner* — Forrest M Phillips
(74) *Attorney, Agent, or Firm* — SALIWANCHIK, LLOYD & EISENSCHENK

(57) ABSTRACT

The invention relates to a method of making an acoustic product and a novel acoustic product, wherein the acoustic product is made by adhering a facing to a first major surface of an acoustic insulation element by the use of an adhesive and curing the adhesive. The adhesive is an aqueous adhesive composition which is free of phenol and formaldehyde and comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

50 Claims, 3 Drawing Sheets

(51) Int. Cl.

| | |
|---|---|
| ***B01J 20/28*** | (2006.01) |
| ***B01J 20/30*** | (2006.01) |
| ***B32B 3/18*** | (2006.01) |
| ***B32B 5/02*** | (2006.01) |
| ***B32B 5/10*** | (2006.01) |
| ***B32B 5/26*** | (2006.01) |
| ***B32B 17/02*** | (2006.01) |
| ***B32B 37/12*** | (2006.01) |
| ***C04B 14/46*** | (2006.01) |
| ***C04B 20/00*** | (2006.01) |
| ***C04B 24/32*** | (2006.01) |
| ***C04B 26/02*** | (2006.01) |
| ***C08J 5/04*** | (2006.01) |
| ***C08K 13/02*** | (2006.01) |
| ***C08L 97/00*** | (2006.01) |
| ***D04H 1/4209*** | (2012.01) |
| ***D04H 1/4218*** | (2012.01) |
| ***D04H 1/587*** | (2012.01) |
| ***D04H 1/60*** | (2006.01) |
| ***D04H 1/72*** | (2012.01) |
| ***E01C 13/08*** | (2006.01) |
| ***E04B 1/88*** | (2006.01) |
| ***E04D 11/02*** | (2006.01) |
| ***E04D 13/04*** | (2006.01) |
| *C04B 103/30* | (2006.01) |
| *C04B 111/52* | (2006.01) |
| *C08K 3/22* | (2006.01) |
| *C08K 5/053* | (2006.01) |
| *C08K 5/07* | (2006.01) |
| *C08K 5/1515* | (2006.01) |
| *C08K 5/1545* | (2006.01) |
| *C08K 5/17* | (2006.01) |
| *C08K 5/20* | (2006.01) |
| *C08K 5/21* | (2006.01) |
| *E04B 1/74* | (2006.01) |
| *E04B 1/84* | (2006.01) |
| *E04D 11/00* | (2006.01) |

(52) U.S. Cl.

CPC ..... *B01J 20/28023* (2013.01); *B01J 20/2803* (2013.01); *B01J 20/3042* (2013.01); *B32B 3/18* (2013.01); *B32B 5/02* (2013.01); *B32B 5/10* (2013.01); *B32B 5/26* (2013.01); *B32B 17/02* (2013.01); *B32B 37/1207* (2013.01); *C04B 14/46* (2013.01); *C04B 20/0048* (2013.01); *C04B 24/32* (2013.01); *C04B 26/02* (2013.01); *C08J 5/0405* (2021.05); *C08K 13/02* (2013.01); *C08L 97/005* (2013.01); *D04H 1/4209* (2013.01); *D04H 1/4218* (2013.01); *D04H 1/587* (2013.01); *D04H 1/60* (2013.01); *D04H 1/72* (2013.01); *E01C 13/08* (2013.01); *E04B 1/88* (2013.01); *E04D 11/02* (2013.01); *E04D 13/0404* (2013.01); *B01J 2220/4837* (2013.01); *B32B 2037/1253* (2013.01); *B32B 2250/02* (2013.01); *B32B 2260/023* (2013.01); *B32B 2260/046* (2013.01); *B32B 2262/101* (2013.01); *B32B 2262/16* (2021.05); *B32B 2307/304* (2013.01); *B32B 2307/72* (2013.01); *B32B 2307/7265* (2013.01); *B32B 2307/7376* (2023.05); *B32B 2419/06* (2013.01); *C04B 2103/30* (2013.01); *C04B 2111/52* (2013.01); *C04B 2201/30* (2013.01); *C08K 3/22* (2013.01); *C08K 5/053* (2013.01); *C08K 5/07* (2013.01); *C08K 5/1515* (2013.01); *C08K 5/1545* (2013.01); *C08K 5/17* (2013.01); *C08K 5/20* (2013.01); *C08K 5/21* (2013.01); *C08K 2201/014* (2013.01); *C08L 2205/06* (2013.01); *C08L 2312/00* (2013.01); *D10B 2401/063* (2013.01); *D10B 2505/18* (2013.01); *E01C 2201/10* (2013.01); *E01C 2201/16* (2013.01); *E01C 2201/20* (2013.01); *E04B 2001/742* (2013.01); *E04B 2001/8461* (2013.01); *E04D 11/002* (2013.01)

(58) Field of Classification Search

CPC ..... B01J 20/2803; B01J 20/3042; B32B 3/18; B32B 5/02; B32B 5/10; B32B 5/26; B32B 17/1207; C04B 14/46; C04B 20/0048; C04B 24/32; C04B 26/02; C08K 13/02

See application file for complete search history.

(56) References Cited

U.S. PATENT DOCUMENTS

| | | | | | |
|---|---|---|---|---|---|
| 3,923,532 | A | | 12/1975 | Morman | |
| 5,318,990 | A | * | 6/1994 | Strauss | C08F 8/14 525/327.7 |
| 5,382,608 | A | | 1/1995 | Gardzielia | |
| 6,238,475 | B1 | | 5/2001 | Gargulak et al. | |
| 6,706,853 | B1 | | 3/2004 | Stanssens et al. | |
| 6,818,699 | B2 | | 11/2004 | Kajimaru et al. | |
| 8,623,234 | B2 | | 1/2014 | Jaffrennou | |
| 10,435,329 | B2 | | 10/2019 | Allais et al. | |
| 2003/0042344 | A1 | | 3/2003 | Fisch et al. | |
| 2004/0034154 | A1 | | 2/2004 | Tutin et al. | |
| 2006/0150494 | A1 | | 7/2006 | Masson | |
| 2007/0173588 | A1 | | 7/2007 | Espiard et al. | |
| 2010/0069662 | A1 | | 3/2010 | Goupp et al. | |
| 2011/0159768 | A1 | | 6/2011 | Crescimanno et al. | |
| 2013/0283688 | A1 | | 10/2013 | Naerum et al. | |
| 2014/0039146 | A1 | | 2/2014 | Abidal | |
| 2014/0094562 | A1 | | 4/2014 | Hagiopol et al. | |
| 2017/0198142 | A1 | | 7/2017 | Hampson et al. | |
| 2018/0002225 | A1 | | 1/2018 | Allais et al. | |
| 2018/0009708 | A1 | | 1/2018 | Allais | |
| 2018/0201542 | A1 | | 7/2018 | Hansen | |
| 2019/0338168 | A1 | | 11/2019 | Laine et al. | |
| 2023/0169947 | A1 | * | 6/2023 | Johansson | B32B 37/1284 181/290 |

FOREIGN PATENT DOCUMENTS

| | | | |
|---|---|---|---|
| CN | 1944014 | A | 4/2007 |
| CN | 107286873 | | 10/2017 |
| DE | 42 26 329 | | 5/1993 |
| DE | 10 2004 047193 | | 9/2005 |
| EP | 0148050 | | 7/1985 |
| EP | 0367194 | | 10/1989 |
| EP | 0583086 | | 2/1994 |
| EP | 0990727 | | 4/2000 |
| EP | 0996653 | | 5/2000 |
| EP | 1578879 | | 1/2007 |
| EP | 1741726 | | 1/2007 |
| EP | 1770123 | A1 | 4/2007 |
| EP | 1889859 | | 2/2008 |
| EP | 1897433 | | 3/2008 |
| EP | 1457107 | | 5/2012 |
| EP | 3299421 | | 3/2018 |
| EP | 3348725 | | 7/2018 |
| EP | 2721102 | | 9/2018 |
| EP | 3632866 | | 4/2020 |
| EP | 3250534 | | 12/2020 |
| FR | 2976583 | | 12/2012 |
| FR | 2976584 | | 12/2012 |
| FR | 2976585 | | 12/2012 |
| FR | 3032194 | | 8/2016 |

(56) References Cited

FOREIGN PATENT DOCUMENTS

| | | | |
|---|---|---|---|
| FR | 3032195 | | 8/2016 |
| GB | 2113517 | | 8/1983 |
| GB | 2177048 | | 1/1987 |
| JP | 200855829 | A | 3/2008 |
| JP | 2016197183 | A | 11/2016 |
| SE | 1950773 | | 12/2020 |
| WO | 87/07520 | | 12/1987 |
| WO | 93/04242 | | 3/1993 |
| WO | 95/34517 | | 12/1995 |
| WO | 98/31763 | | 7/1998 |
| WO | 98/31825 | | 7/1998 |
| WO | 98/31895 | | 7/1998 |
| WO | 99/36368 | | 7/1999 |
| WO | 00/57101 | | 9/2000 |
| WO | 01/05725 | | 1/2001 |
| WO | 01/96460 | | 12/2001 |
| WO | 02/06178 | | 1/2002 |
| WO | 02/066877 | | 8/2002 |
| WO | 2004/007615 | | 1/2004 |
| WO | 2004/033194 | | 4/2004 |
| WO | 2005/095727 | | 10/2005 |
| WO | 2006/061249 | | 6/2006 |
| WO | 2008/009278 | | 1/2008 |
| WO | 2008/009460 | | 1/2008 |
| WO | 2008/009461 | | 1/2008 |
| WO | 2008/009462 | | 1/2008 |
| WO | 2008/009465 | | 1/2008 |
| WO | 2008/009467 | | 1/2008 |
| WO | 2008/023032 | | 2/2008 |
| WO | 2008/073186 | | 6/2008 |
| WO | 2008/155401 | | 12/2008 |
| WO | 2009/090053 | | 7/2009 |
| WO | 2010/003677 | | 1/2010 |
| WO | 2010/046074 | | 4/2010 |
| WO | 2010/093785 | | 8/2010 |
| WO | 2011/042610 | | 4/2011 |
| WO | 2011/044490 | | 4/2011 |
| WO | 2012/028650 | | 3/2012 |
| WO | 2012/076462 | | 6/2012 |
| WO | 2012/113058 | | 8/2012 |
| WO | 2012/167252 | | 12/2012 |
| WO | 2012/172262 | | 12/2012 |
| WO | 2013/034376 | | 3/2013 |
| WO | 2013/060634 | | 5/2013 |
| WO | 2013/072082 | | 5/2013 |
| WO | 2013/113410 | | 8/2013 |
| WO | 2014/029872 | | 2/2014 |
| WO | 2014/029873 | | 2/2014 |
| WO | 2015/022550 | | 2/2015 |
| WO | 2016/009054 | | 1/2016 |
| WO | 2016/120575 | | 8/2016 |
| WO | 2016/120576 | | 8/2016 |
| WO | 2016/120579 | | 8/2016 |
| WO | 2017/074771 | | 5/2017 |
| WO | 2017/114723 | | 7/2017 |
| WO | 2017/114724 | | 7/2017 |
| WO | 2017/194718 | | 11/2017 |
| WO | 2017/194722 | | 11/2017 |
| WO | 2018/158677 | | 9/2018 |
| WO | 2018/193166 | | 10/2018 |
| WO | 2018/206132 | | 11/2018 |
| WO | 2019/202475 | | 10/2019 |
| WO | 2019/202477 | | 10/2019 |
| WO | 2020/008311 | | 1/2020 |
| WO | 2020/018599 | | 1/2020 |
| WO | 2020/058384 | | 3/2020 |
| WO | 2020/070337 | | 4/2020 |
| WO | 2020/070341 | | 4/2020 |
| WO | 2020/104523 | | 5/2020 |
| WO | 2020/109983 | | 6/2020 |
| WO | 2020/261087 | | 12/2020 |
| WO | 2021/124125 | | 6/2021 |
| WO | 2021/197626 | | 10/2021 |
| WO | 2021/198474 | | 10/2021 |

OTHER PUBLICATIONS

Xiangwei Zhu et al., Bio-Based Wood Adhesive from Camelina Protein (a Biosiesel Residue) and Depolymerized Lignin with Improved Water resistance, ACS Omega, Nov. 16, 2017, vol. 2, No. 11, 7996-8004.

International Search Report, International Application No. PCT/EP2019/077133, mail date Dec. 9, 2019, 6 pages.

International Search Report and Written Opinion, International Application No. PCT/EP2020/059645, mail date Feb. 23, 2021, 17 pages.

International Search Report and Written Opinion, International Application No. PCT/EP2020/059649, mail date Oct. 21, 2020, 13 pages.

International Search Report and Written Opinion, International Application No. PCT/EP2020/059619, mail date Dec. 7, 2020, 22 pages.

International Search Report and Written Opinion, International Application No. PCT/EP2020/059671, mail date Jan. 18, 2021, 12 pages.

International Search Report and Written Opinion, International Application No. PCT/EP2020/059636, mail date Dec. 11, 2020, 20 pages.

International Search Report and Written Opinion, International Application No. PCT/EP2020/059670, mail date Jan. 18, 2021, 12 pages.

International Search Report and Written Opinion, International Application No. PCT/EP2020/059666, mail date Jan. 25, 2021, 14 pages.

International Search Report and Written Opinion, International Application No. PCT/EP2020/059651, mail date Jan. 25, 2021, 15 pages.

International Search Report and Written Opinion, International Application No. PCT/EP2020/059650, mail date Dec. 10, 2020, 17 pages.

International Search Report and Written Opinion, International Application No. PCT/EP2020/059660, mail date Jan. 18, 2021, 12 pages.

International Search Report and Written Opinion, International Application No. PCT/EP2020/059655, mail date Jan. 18, 2021, 13 pages.

International Search Report and Written Opinion, International Application No. PCT/EP2020/059617, mail date Dec. 15, 2020, 16 pages.

International Search Report, International Application No. PCT/EP201/076123, mail date Oct. 21, 2019, 4 pages.

International Search Report and Written Opinion, International Application No. PCT/EP2020/059656, mail date Dec. 18, 2020, 16 pages.

International Search Report and Written Opinion, International Application No. PCT/EP2020/059659, mail date Jan. 18, 2021.

Masoumeh Ghorbani et al., Ammoxidized Fenton-Activated Pine Kraft Lignin Accelerates Synthesis and Curing of Resole Resins, Polymers 2017, 9, 43.

Dietrich Meier et al., Conversion of Technical Lignins into Slow-Release Nitrogenous Fertilizers by Ammoxidation in Liquid Phase, Bioresource Technology, 49, 1994, 121-128.

Richard J.A. Gosselink et al., Effect of periodate on lignin for wood adhesive application, International Journal of the Biology, Chemistry, Physics and Technology of Wood, vol. 65, No. 2, Jan. 1, 2011, pp. 155-162.

Venla Hemmila et al., Lignin: an adhesive raw material of the future or waste of research energy?, Northern European Network for Wood Science and Engineering (WSE), Sep. 11-12, 2013, pp. 98-103.

International Search Report and Written Opinion, International Application No. PCT/EP2021/077189, mail date Jan. 18, 2022.

International Search Report and Written Opinion, International Application No. PCT/EP2021/077185, mail date Jan. 18, 2022.

International Search Report and Written Opinion, International Application No. PCT/EP2021/077186, mail date Jan. 18, 2022.

International Search Report and Written Opinion, International Application No. PCT/EP2021/077191, mail date Jan. 18, 2022.

(56) References Cited

OTHER PUBLICATIONS

International Search Report and Written Opinion, International Application No. PCT/EP2021/077194, mail date Jan. 18, 2022.
International Search Report and Written Opinion, International Application No. PCT/2021/077183, mail date Jan. 18, 2022.
International Search Report and Written Opinion, International Application No. PCT/EP2021/077195, mail date Jan. 18, 2022.
International Search Report, International Application No. PCT/EP2021/077193, mail date Nov. 8, 2021.
International Search Report and Written Opinion, International Application No. PCT/EP2021/077135, mail date Jan. 18, 2022.
International Search Report, International Application No. PCT/EP2021/077180, mail date Jan. 18, 2022.
International Search Report and Written Opinion, International Application No. PCT/EP2020/059645, mail date Dec. 14, 2020.
International Search Report and Written Opinion, International Application No. PCT/EP2021/058706, mail date Jun. 17, 2021.

* cited by examiner

ACOUSTIC PRODUCTS

CROSS-REFERENCE TO RELATED APPLICATIONS

This application is a national stage application of International Patent Application No. PCT/EP2021/077183, filed Oct. 1, 2021, which claims priority to International Patent Application No. PCT/EP2020/088061, filed Dec. 30, 2020, the disclosures of each of which are incorporated herein by reference in their entirety, including any figures, tables, and drawings.

The invention relates to acoustic products for sound insulation and absorption. In particular the invention relates to methods of making such acoustic products and systems comprising such acoustic products.

It is well known to provide acoustic products for sound absorption and insulation. A common form for such products is an acoustic element in the form of a panel and having a facing adhered to a major surface of the panel.

It is important that the adhesive used to adhere the facing to the panel has appropriate properties. In particular it is important that the adhesion strength (usually defined in terms of peel-off strength) is adequate.

It is common to use phenol-formaldehyde resin as an adhesive for the facing. This is particularly useful in the context of acoustic panels which are formed of a matrix of man-made vitreous fibres (MMVF) bonded by a binder, because phenol-formaldehyde resins are commonly used as binder for such products already. Phenol-formaldehyde adhesive gives good results and is commonly used in commercial practice.

Phenol-formaldehyde resins can be economically produced and can be extended with urea prior to use as a binder. However, the existing and proposed legislation directed to the lowering or elimination of formaldehyde emissions has led to the development of formaldehyde-free binders such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde binders are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties in terms of curing speed and curing density.

WO 2008/023032 discloses urea-modified binders of that type which provide mineral wool products having reduced moisture take-up.

These could in principle be used as adhesives for the facing on an acoustic element. However, since some of the starting materials used in the production of these binders are rather expensive chemicals, there is an ongoing need to provide formaldehyde-free adhesives which are economically produced.

A further effect in connection with previously known aqueous adhesive compositions for mineral fibres is that at least the majority of the starting materials used for the productions of these binders stem from fossil fuels. There is an ongoing trend of consumers to prefer products that are fully or at least partly produced from renewable materials and there is therefore a need to provide binders for mineral wool which are, at least partly, produced from renewable materials.

A further effect in connection with previously known aqueous adhesive compositions for mineral fibres is that they involve components which are corrosive and/or harmful. This requires protective measures for the machinery involved in the production of mineral wool products to prevent corrosion and also requires safety measures for the persons handling this machinery. This leads to increased costs and health issues and there is therefore a need to provide adhesive compositions with a reduced content of corrosive and/or harmful materials.

In the meantime, a number of binders for mineral fibres have been provided, which are to a large extent based on renewable starting materials. In many cases these binders based to a large extent on renewable resources are also formaldehyde-free.

However, many of these binders are still comparatively expensive because they are based on comparatively expensive basic materials and so their use as adhesives for bonding a facing to an acoustic element would be uneconomical.

Accordingly, it is an object of the present invention to provide an adhesive composition which is particularly suitable for bonding a facing to an acoustic element, uses renewable materials as starting materials, reduces or eliminates corrosive and/or harmful materials, and is comparatively inexpensive to produce.

A further object of the present invention is to provide an acoustic product formed of an acoustic element having bonded to it a facing, wherein the adhesion properties are good, and in particular as good as those provided by phenol-formaldehyde binder, but which minimises the disadvantages of phenol-formaldehyde binder.

According to a first aspect of the invention we provide a method of making an acoustic product, the method comprising:

- providing an acoustic element comprising first and second major surfaces;
- providing a first facing;
- fixing the first facing to the first major surface of the acoustic element by the use of an adhesive; and
- curing the adhesive, wherein the adhesive is an aqueous composition which is free of phenol and formaldehyde and comprises:
  - a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
  - a component (ii) in form of one or more cross-linkers.

In the invention we use as an adhesive a composition as defined above. This has the advantage that it gives adhesion properties which are commercially acceptable, and indeed as good as those of phenol-formaldehyde resin, but without the attendant disadvantages.

According to a second aspect of the invention we provide an acoustic product obtained by the method of the first aspect of the invention.

According to a third aspect of the invention we provide an acoustic product comprising an acoustic element comprising first and second major surfaces and a first facing, wherein the first facing is fixed to the first major surface of the acoustic element by an adhesive, wherein the adhesive before curing is an aqueous adhesive composition which is free of phenol and formaldehyde and which comprises:

- a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

A preferred method of making the acoustic products comprises applying a second facing to the second major surface of the acoustic element prior to curing, and, after curing, cutting the acoustic element into two halves in the plane parallel to the major faces. Each half has a cut face which becomes the front face of the acoustic product. Each acoustic element has front and rear major faces which extend in the XY plane and side edges which extend in the Z direction between the front and rear faces. The front face is the face which is to face towards the room or other space which is to benefit from the sound absorption properties.

Each front face is abraded to make it as flat as possible, and a further facing is usually then bonded to it. The first and second facings are thus on the back faces of the two acoustic products that have been made.

The acoustic products that have been formed according to the method of the first aspect of the invention or that are according to the second and third aspects of the invention can be formed into a suspended ceiling system comprising a plurality of acoustic products suspended in a grid. It is also useful to provide a wall system comprising a plurality of acoustic products as defined according to the second or third aspect of the invention suspended on a wall.

The method of the invention comprises providing an acoustic element. This can be an acoustic insulation element but is more commonly an acoustic absorption element. Thus more commonly it is capable of absorbing soundwaves which reach its surface.

The acoustic element can be formed of any material known for provision of acoustic elements but preferably it is formed of MMVF. The acoustic element can be made by casting wet or fluid materials (for instance they can be made from wet-laid mineral fibres) but it is preferred to form acoustic elements of air-laid mineral fibres, usually bonded in a matrix with a binder.

The binder can be any of the binders known for use in bonding MMVF.

Preferably the binder is an organic binder such as phenol formaldehyde binder, urea formaldehyde binder, phenol urea formaldehyde binder or melamine formaldehyde binder. Conventionally-used phenol-formaldehyde or phenol-urea-formaldehyde (PUF) based resol binders optionally contain a sugar component. For these binders, without sugar component, reference is for example made to EP 0148050 and EP 0996653. For these binders, with sugar component, reference is made to WO 2012/076462.

It can be a formaldehyde-free binder such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde binders that can be used in the MMVF matrix are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties in terms of curing speed and curing density. WO 2008/023032 discloses urea-modified binders of that type which provide mineral wool products having reduced moisture take-up.

Preferably the binder for the MMVF is an aqueous adhesive composition which is free of phenol and formaldehyde and comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

Further preferred features of the binder are described below in the context of the material used as the adhesive. All of the same preferred features are applicable, independently of the features of the adhesive, when a material in this class is used as binder for MMVF in the acoustic element.

The density of the acoustic element is preferably in the range of 40 to 180 kg/m$^3$, preferably 80 to 160 kg/m$^3$, preferably 100 to 140 kg/m$^3$. More preferably it is at least 100 kg/m$^3$. In particular it is often not more than 150 kg/m$^3$.

When the acoustic element is formed of MMVF, the loss on ignition (LOI) of the batt of man-made vitreous fibres bonded by the binder is generally within the range of 0.5 to 8 wt %, preferably 2 to 5 wt %. The LOI is taken as the binder content, in conventional manner. Binder will normally include minor amounts of oil and other organic binder additives in addition to the main bonding components.

When the acoustic element is formed of MMVF, the MMVF generally have average fibre diameter in the range 3 to 8 microns.

The acoustic element is usually in the form of a panel. The element has first and second major faces which are essentially parallel (and extend in the XY direction). These are connected by minor faces, which are usually perpendicular to the major faces (and so extend in the Z direction).

The acoustic element, when formed of MMVF, is formed by a standard process for production of an MMVF panel.

MMV fibres can be made from a mineral melt. A mineral melt is provided in a conventional manner by providing mineral materials and melting them in a furnace. This furnace can be any of the types of furnace known for production of mineral melts for MMVF, for instance a shaft furnace such as a cupola furnace, a tank furnace, or a cyclone furnace.

Any suitable method may be employed to form MMVF from the mineral melt by fiberization. The fiberization can be by a spinning cup process in which melt is centrifugally extruded through orifices in the walls of a rotating cup (spinning cup, also known as internal centrifugation). Alternatively the fiberization can be by centrifugal fiberization by projecting the melt onto and spinning off the outer surface of one fiberizing rotor, or off a cascade of a plurality of fiberizing rotors, which rotate about a substantially horizontal axis (cascade spinner).

Binder for the fibres is applied as they are formed and entrained in air. The fibres can initially be collected on the collector as a primary web and this primary web is then cross-lapped in conventional manner to form a secondary web.

The first facing is preferably applied to the first major face before the step of curing the binder for the MMVF. This is also the case fora second facing if used. This means that the adhesive for the facing(s) can also be cured in the same curing step as the binder. However, it is also possible to apply the facing(s) after the binder for the matrix of MMVF has been cured, and then conduct a step of curing the adhesive.

When a second facing is applied, preferably the adhesive for the second facing is of the same chemical type as the adhesive for the first facing.

Curing of the adhesive is preferably carried out at temperatures from 100 to 300° C., such as 170 to 270° C., such as 180 to 250° C., such as 190 to 230° C.

In a preferred embodiment, the curing of the adhesive takes place in a conventional curing oven for mineral wool production, preferably operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

In a typical embodiment, curing takes place at a temperature of 150 to 250° C. for a time of 30 seconds to 20 minutes.

Where the acoustic product is a bonded web of MMVF, the web also includes a binder. This also has to be cured. The curing process for the binder may commence immediately after application of the binder to the fibres.

The curing of adhesive and/or binder is defined as a process whereby the adhesive/binder composition undergoes a physical and/or chemical reaction which in case of a chemical reaction usually increases the molecular weight of the compounds in the adhesive/binder composition and thereby increases the viscosity of the adhesive/binder composition, usually until the adhesive/binder composition reaches a solid state. The cured binder composition binds the fibres to form a structurally coherent matrix of fibres. The cured adhesive composition bonds the facing(s) to the acoustic element.

In a one embodiment, the curing of the adhesive/binder takes place in a heat press. The curing of a binder in contact with mineral fibres in a heat press has the particular advantage that it enables the production of high-density products.

In one embodiment the curing process comprises drying by pressure. The pressure may be applied by blowing air or gas through/over the product to be cured.

Two products can be made by forming a cured batt of fibres with first and second facings bonded to the first and second major faces respectively and then cutting the batt into two halves in the plane parallel to the major faces. Each half has a cut face which becomes the front face of the acoustic product. Each front face is abraded to make it as flat as possible.

In the method it is also possible to apply a further facing on the front face. This is preferably applied using dry binder rather than adhesive according to the invention.

Preferably the method of the invention is according to WO 2005/095727. According to this method the acoustic products are made by a process comprising collecting MMVF entrained in air on a travelling collector and vertically compressing the collected fibres, optionally after cross-lapping, to form a web, reorienting the fibres to provide an unbonded batt having a density of 70 to 200 kg/$m^3$ and an increased fibre orientation in the Z direction, curing the binder to form a cured batt, cutting the cured batt in the XY plane into two cut batts at a position in the Z dimension wherein the fibres have the increased orientation in the Z direction, and smoothing each cut surface by abrasion to produce a flat smooth face.

Preferably, the first and preferably second facings are applied to the first and second major faces of the batt before the curing step.

The method can also comprise the routine steps of forming elements having the desired XY dimensions by subdividing the cured batt before it is cut into the two cut batts and/or by subdividing the cut batts before or after abrasion, to form elements having the desired XY dimensions.

The cutting of the bonded batt can be conducted in conventional manner, for instance using a band saw or rotary saw having a suitably small tooth size, for instance resembling a conventional fine wood saw. The abrasion or grinding can be by abrasive belt or any other abrasive or grinding element. The abrasive particles on the belt can be relatively coarse and thus the abrasion can be similar to a conventional coarse wood abrader or grinder.

Other details of preferred production methods can be found in WO 2005/095727.

The acoustic product has a thickness which is the perpendicular distance between the major faces of the product. This is usually in the range of 12 to 100 mm, such as 15 to 50 mm.

The acoustic product has a length which is preferably in the range 550 to 650 mm or in the range 1100 to 1300 mm. Preferred lengths are around 600 mm and around 1200 mm. For special products the length could be up to 3000 mm, which however gives rise to practical problems with handling and installation, so can be less preferred.

The acoustic product has a width in the range 550 to 650 mm. A preferred width is about 600 mm. For special products the length could be as low as 150 mm, which however increases installation time, but can be preferred for design reasons, or to utilize parts of products that would otherwise be scrapped.

The first and second and further facings may independently be any of the materials known for use as a facing for an acoustic product. Preferably the or each facing is a fibre veil, in particular a glass fibre veil. Glass fibre veils can be themselves bonded with a binder, for instance any of the conventional binders known for bonding a matrix of MMVF. Binder content of the veil can be in the range 10 to 25%, for instance 12 to 23%.

An example of such a glass veil is Owens Corning I50U. Another example is Evalith Glass Fibre Veil DH50/20. Another suitable glass veil is Saint-Gobain Adfors Glass Veil U 50 D75.

A facing, for example glass fibre veil, may have an area weight in the range 20 to 80 g/$m^2$, preferably in the range 40 to 60 g/$m^2$.

In the method the adhesive is usually applied to the first facing, and the second facing if used, before the facing is brought into contact with the respective major face of the acoustic element. It is however possible to apply the adhesive directly to the major face of the element to which the facing is to be adhered.

Application weight is preferably in the range 5 to 12 g/$m^2$, preferably 7 to 10 g/$m^2$. Application weight is dry solids content per $m^2$.

Preferably the adhesive is applied by passing the facing through a coating bath containing adhesive. Another method of application is by spraying.

Any of the facings can be provided with a paint coating. Paint can be applied to a facing prior to adhering it to the acoustic element, or after it has been applied.

The product is an acoustic product and therefore preferably has good acoustic absorption properties. For instance the sound absorption coefficient aw is preferably at least 0.7, more preferably at least 0.8, more preferably at least 0.85 and even more preferably at least 0.9 or 0.95. Sound absorption coefficient aw is determined at the front face.

The acoustic product made according to the method of the invention, and the acoustic product of the third aspect of the invention, can be used in any of the applications known for acoustic products.

For instance it may be a ceiling tile or form part of a suspended ceiling, or be used as a wall tile or as a baffle. Acoustic products can be bonded direct to a wall or ceiling, but usually they are mounted on a grid, and in particular it is desirable to provide ceiling tiles that are suspended from a grid.

The adhesive used according to the present invention is in the form of an aqueous composition. Preferred features are discussed below. When the acoustic product is formed of MMVF bonded with a binder, the binder may also be of the type discussed below, and all the same preferred features apply.

The man-made vitreous fibres (MMVF) used in the invention can be any MMVF such as, e.g., glass fibres, ceramic fibres, basalt fibres, slag wool, mineral wool and stone wool, which are bonded together by a cured binder. Bonded MMVF (also described as mineral fibres) are generally produced by converting a melt made of suitable raw materials to fibres in conventional manner, for instance by a spinning cup process or by a cascade rotor process. The fibres are blown into a forming chamber and, while airborne and while still hot, are sprayed with binder solution and randomly deposited as a mat or web onto a travelling conveyor. The fibre mat is then transferred to a curing oven where heated air is blown through the mat to cure the binder and rigidly bond the mineral fibres together.

The acoustic product of the present invention uses an aqueous adhesive (optionally also a binder) composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

In particular, the adhesive is an aqueous composition free of phenol and formaldehyde comprising:

a component in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous composition does not comprise a cross-linker selected from epoxy compounds having a molecular weight $M_w$ of 500 or less.

In particular, the adhesive is an aqueous composition free of phenol and formaldehyde comprising:

a component in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous composition does not comprise a cross-linker selected from polyamines.

In particular, the adhesive is an aqueous composition free of phenol and formaldehyde comprising:

a component in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous composition does not comprise a cross-linker selected from mono- and oligosaccharides.

In one embodiment, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers selected from β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide and/or the group consisting of multifunctional organic amines such as an alkanolamine, diamines, such as hexamethyldiamine, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides, and/or Primid XL-552, with the proviso that the aqueous composition does not comprise a cross-linker selected from epoxy compounds having a molecular weight $M_w$ of 500 or less carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

Optionally, the aqueous composition additionally comprises a component (iii) in form of one or more plasticizers.

In one embodiment, the adhesive is an aqueous composition free of phenol and formaldehyde comprising:

a component in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers.

In particular, the adhesive is an aqueous composition free of phenol and formaldehyde comprising:

a component in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from epoxy compounds having a molecular weight $M_w$ of 500 or less.

In particular, the adhesive is an aqueous composition free of phenol and formaldehyde comprising:

a component in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

In particular, the adhesive is an aqueous composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous composition does not comprise a cross-linker selected from polyamines.

In particular, the adhesive is an aqueous composition free of phenol and formaldehyde comprising:

a component in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous composition does not comprise a cross-linker selected from mono- and oligosaccharides.

In one embodiment, the adhesive is an aqueous composition free of phenol and formaldehyde comprising:

a component in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers selected from β-hydroxyalkylamide-cross-linkers, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides; and/or Primid XL-552;

a component (iii) in form of one or more plasticizers, with the proviso that the aqueous composition does not comprise a cross-linker selected from epoxy compounds having a molecular weight $M_w$ of 500 or less carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

In a preferred embodiment, the adhesives are formaldehyde free.

For the purpose of the present application, the term "formaldehyde free" is defined to characterize a mineral wool product where the emission is below 5 μg/$m^2$/h of formaldehyde from the mineral wool product, preferably below 3 μg/$m^2$/h. Preferably, the test is carried out in accordance with ISO 16000 for testing aldehyde emissions.

In a preferred embodiment, the adhesives are phenol free.

For the purpose of the present application, the term "phenol free" is defined in such a way that the aqueous composition contains phenol

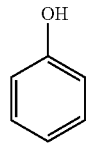

in an amount of ≤0.25 wt.-%, such as ≤0.1 wt.-%, such as ≤0.05 wt.-%, based on the total weight of an aqueous composition having a dry solids binder content of 15 wt. %.

In one embodiment, the adhesive composition does not contain added formaldehyde.

In one embodiment, the adhesive composition does not contain added phenol.

For the purpose of the present invention, the term "mono- and oligosaccharides" is defined to comprise monosaccharides and oligosaccharides having 10 or less saccharide units.

For the purpose of the present invention, the term "sugar" is defined to comprise monosaccharides and oligosaccharides having 10 or less saccharide units.

Component (i)

Component (i) is in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.

Lignin, cellulose and hemicellulose are the three main organic compounds in a plant cell wall. Lignin can be thought of as the glue, that holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

The lignosulfonate process introduces large amount of sulfonate groups making the lignin soluble in water but also in acidic water solutions. Lignosulfonate has up to 8% sulfur as sulfonate, whereas kraft lignin has 1-2% sulfur, mostly bonded to the lignin. The molecular weight of lignosulfonate is 15.000-50.000 g/mol. The typical hydrophobic core of lignin together with large number of ionized sulfonate groups make this lignin attractive as a surfactant and it often finds application in dispersing cement etc.

To produce lignin-based value-added products, lignin should be first separated from biomass, for which several methods can be employed. Kraft and sulfite pulping processes are known for their effective lignin separation from wood, and hence, are used worldwide. Kraft lignin is separated from wood with the help of NaOH and Na2S. Lignins from sulfite pulping processes are denoted as lignosulfonates, and are produced by using sulfurous acid and/or a sulfite salt containing magnesium, calcium, sodium, or ammonium at varying pH levels. Currently, lignosulfonates account for 90% of the total market of commercial lignin, and the total annual worldwide production of lignosulfonates is approximately 1.8 million tons. Lignosulfonates have generally abundance of sulfonic groups, and thus, a higher amount of sulfur than kraft lignin. Due to the presence of the sulfonated group, lignosulfonates are anionically charged and water soluble. The molecular weights ($M_w$) of lignosulfonates can be similar to or larger than that of kraft lignin. Due to their unique properties, lignosulfonates have a wide range of uses, such as animal feed, pesticides, surfactants, additives in oil drilling, stabilizers in colloidal suspensions, and as plasticizers in concrete admixtures. However, the majority of new pulp mills employ kraft technology for pulp production, and thus, kraft lignin is more readily available for value-added production.

However, lignosulfonates and kraft lignin have different properties coming from different isolation processes and thus distribution of functional groups. High level of sulfonic groups in lignosulfonates, generally at least one for every four C9 units, makes lignosulfonates strongly charged at all pH levels in water. This abundance of ionisable functional groups can explain most of the differences compared to other technical lignins. Higher charge density allows easier water solubility and higher solid content in solution possible compared to kraft lignin. Also, for the same reason, lignosulfonates will have lower solution viscosity compared to kraft lignin at the same solid content which can facilitate handling and processing. Commonly used model structure of lignosulfonates is shown in FIG. 1.

In one embodiment, component (i) is having a carboxylic acid group content of 0.05 to 0.6 mmol/g, such as 0.1 to 0.4 mmol/g, based on the dry weight of lignosulfonate lignins.

In one embodiment, component (i) is in form of one or more lignosulfonate lignins having an average carboxylic acid group content of less than 1.8 groups per macromolecule considering the M_n wt. average of component (i), such as less than 1.4 such as less than 1.1 such as less than 0.7 such as less than 0.4.

In one embodiment, component (i) is having a content of phenolic OH groups of 0.3 to 2.5 mmol/g, such as 0.5 to 2.0 mmol/g, such as 0.5 to 1.5 mmol/g. based on the dry weight of lignosulfonate lignins.

In one embodiment, component (i) is having a content of aliphatic OH groups of 1.0 to 8.0 mmol/g, such as 1.5 to 6.0 mmol/g, such as 2.0 to 5.0 mmol/g, based on the dry weight of lignosulfonate lignins.

In one embodiment, component (i) comprises ammoniumlignosulfonates and/or calciumlignosulfonates, and/or magnesiumlignosulfonates, and any combinations thereof.

In one embodiment, component (i) comprises ammoniumlignosulfonates and calciumlignosulfonates, wherein the molar ratio of $NH_4^+$ to $Ca^{2+}$ is in the range of 5:1 to 1:5, in particular 3:1 to 1:3.

For the purpose of the present invention, the term lignosulfonates encompasses sulfonated kraft lignins.

In one embodiment, component (i) is a sulfonated kraft lignin.

In one embodiment, the aqueous composition contains added sugar in an amount of 0 to 5 wt.-%, such as less than 5 wt.-%, such as 0 to 4.9 wt.-%, such as 0.1 to 4.9 wt.-%, based on the weight of lignosulfonate and sugar.

In one embodiment, the aqueous composition comprises component (i), i.e. the lignosulfonate, in an amount of 50 to 98 wt.-%, such as 65 to 98 wt.-%, such as 80 to 98 wt.-%, based on the total weight of components (i) and (ii).

In one embodiment, the aqueous composition comprises component (i) in an amount of 50 to 98 wt.-%, such as 65 to 98 wt.-%, such as 80 to 98 wt.-%, based on the dry weight of components (i), (ii), and (iii).

For the purpose of the present invention, content of lignin functional groups is determined by using $^{31}P$ NMR as characterization method.

Sample preparation for $^{31}P$ NMR is performed by using 2-chloro-4,4,5,5-tetramethyl-1,3,2-dioxaphospholane (TMDP) as phosphitylation reagent and cholesterol as internal standard. Integration is according to the work of Granata and Argyropoulos (J. Agric. Food Chem. 43:1538-1544).

Component (ii)

Component (ii) is in form of one or more cross-linkers.

In one embodiment, the component (ii) comprises in one embodiment one or more cross-linkers selected from β-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the β-hydroxyalkylamide cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing cross-linkers can easily be obtained by polymerizing an oxazoline derivative. The patent U.S. Pat. No. 6,818,699 B2 provides a disclosure for such a process.

In one embodiment, the component (ii) is one or more epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, such as β-hydroxyalkylamide groups.

In one embodiment, component (ii) is one or more cross-linkers selected from the group consisting of fatty amines.

In one embodiment, component (ii) is one or more cross-linkers in form of fatty amides.

In one embodiment, component (ii) is one or more cross-linkers selected from polyester polyols, such as polycaprolactone.

In one embodiment, component (ii) is one or more cross-linkers selected from the group consisting of starch, modified starch, CMC.

In one embodiment, component (ii) is one or more cross-linkers in form of multifunctional carbodiimides, such as aliphatic multifunctional carbodiimides.

In one embodiment, the component (ii) is one or more cross-linkers in form of aziridines, such as CX100, NeoAdd-Pax 521/523.

In one embodiment, component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

In one embodiment, component (ii) is Primid XL552, which has the following structure:

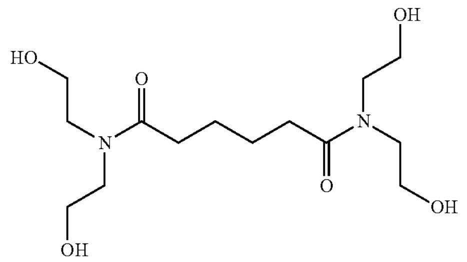

Primid XL-552

Component (ii) can also be any mixture of the above mentioned compounds.

In one embodiment, the adhesive composition comprises component (ii) in an amount of 1 to 50 wt.-%, such as 4 to 20 wt.-%, such as 6 to 12 wt.-%, based on the dry weight of component (i).

In one embodiment, component (ii) is in form of one or more cross-linkers selected from

- β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide and/or
- the group consisting of multifunctional organic amines such as an alkanolamine, diamines, such as hexamethyldiamine, and/or
- epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or
- one or more cross-linkers in form of multifunctional carbodiimides, such as aliphatic multifunctional carbodiimides.

In one embodiment, component (ii) comprises one or more cross-linkers selected from

- β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide.

In one embodiment, component (ii) comprises component (ii) in an amount of 2 to 90 wt.-%, such as 6 to 60 wt.-%, such as 10 to 40 wt.-%, such as 25 to 40 wt.-%, based on the dry weight of component (i).

Component (iii) of the adhesive composition The adhesive composition may comprise a component (iii). Component (iii) is in form of one or more plasticizers.

In one embodiment, component (iii) is in form of one or more plasticizers selected from the group consisting of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iii) is in form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanillin, acetosyringone.

In one embodiment, component (iii) is in form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers, and/or one or more plasticizers in form of polyols, such as 1,1,1-Tris(hydroxymethyl)propane, and/or triethanolamine.

Another particular surprising aspect of the adhesive composition used in the present invention is that the use of plasticizers having a boiling point of more than 100° C., in particular 140 to 250° C., strongly improves the mechanical properties of the acoustic product of the present invention although, in view of their boiling point, it is likely that these plasticizers will at least in part evaporate during the curing of the adhesive in contact with the mineral fibres.

In one embodiment, component (iii) comprises one or more plasticizers having a boiling point of more than 100° C., such as 110 to 380° C., more preferred 120 to 300° C., more preferred 140 to 250° C.

It is believed that the effectiveness of these plasticizers in the adhesive composition is associated with the effect of increasing the mobility of the lignins during the curing process. It is believed that the increased mobility of the lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetamides, benzamide, fatty acid amides such as tall oil amides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more plasticizers selected from the group consisting of vegetable oils such as castor oil, palm oil, linseed oil, tall oil, soybean oil.

In one embodiment, component (iii) is in form of tall oil.

In one embodiment, component (iii) is selected from one or more plasticizers selected from the group consisting of hydrogenated oils, acetylated oils.

In one embodiment, component (iii) is selected from one or more fatty acid methyl esters.

In one embodiment, component (iii) is selected from one or more plasticizers selected from the group consisting of alkyl polyglucosides, gluconamides, aminoglucoseamides, sucrose esters, sorbitan esters.

In one embodiment, component (iii) is selected from the group consisting of polyethylene glycols, polyethylene glycol ethers.

In one embodiment, component (iii) is selected from the group consisting of triethanolamine.

In one embodiment, component (iii) is in form of propylene glycols, phenol derivatives, silanols, siloxanes, hydroxy acids, vegetable oils, polyethylene glycols, polyethylene glycol ethers, and/or one or more plasticizers in form of polyols, such as 1,1,1-Tris(hydroxymethyl)propane, triethanolamine, or any mixtures thereof.

It has been found that the inclusion of plasticizers in the adhesive compositions may improve the mechanical properties of the acoustic product of the present invention.

The term plasticizer refers to a substance that is added to a material in order to make the material softer, more flexible (by decreasing the glass-transition temperature Tg) and easier to process.

Component (iii) can also be any mixture of the above mentioned compounds.

In one embodiment, component (iii) is present in an amount of 0.5 to 60, preferably 2.5 to 25, more preferably 3 to 15 wt.-%, based on the dry weight of component (i).

In one embodiment, component (iii) is present in an amount of 0.5 to 60, preferably 2.5 to 25, more preferably 3 to 15 wt.-%, based on the dry weight of components (i), (ii), and (iii).

Adhesive Resulting from the Curing of an Adhesive Composition Comprising Components (i) and (iia)

In one embodiment the adhesive composition comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.

a component (iia) in form of one or more modifiers, preferably with the proviso that the aqueous adhesive composition does not comprise a cross-linker selected from epoxy compounds having a molecular weight $M_W$ of 500 or less, and/or with the proviso that the aqueous adhesive composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, and/or with the proviso that the aqueous adhesive composition does not comprise a cross-linker selected from polyamines, and/or with the proviso that the aqueous adhesive composition does not comprise a cross-linker selected from mono- and oligosaccharides.

The present inventors have found that the excellent adhesive properties can also be achieved by a two-component system which comprises component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins and a component (iia) in form of one or more modifiers, and optionally any of the other components mentioned above and below.

In one embodiment, component (iia) is a modifier in form of one or more compounds selected from the group consisting of epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups such as β-hydroxyalkylamide groups.

In one embodiment, component (iia) is one or more modifiers selected from the group consisting of polyethylene imine, polyvinyl amine, fatty amines.

In one embodiment, the component (iia) is one or more modifiers selected from multifunctional carbodiimides, such as aliphatic multifunctional carbodiimides.

Component (iia) can also be any mixture of the above mentioned compounds.

Without wanting to be bound by any particular theory, the present inventors believe that the excellent adhesive properties achieved by the adhesive composition comprising components (i) and (iia), and optional further components, are at least partly due to the effect that the modifiers used as components (iia) at least partly serve the function of a plasticizer and a cross-linker.

In one embodiment, the adhesive composition comprises component (iia) in an amount of 1 to 40 wt.-%, such as 4 to 20 wt.-%, such as 6 to 12 wt.-%, based on the dry weight of the component (i).

Further Components

In some embodiments, the adhesive comprises further components.

In one embodiment, the adhesive composition comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid, and/or sodium polyphosphate (STTP), and/or sodium metaphosphate (STMP), and/or phosphorous oxychloride. The presence of such a catalyst can improve the curing properties of the adhesive compositions.

In one embodiment, the adhesive composition comprises a catalyst selected from Lewis acids, which can accept an electron pair from a donor compound forming a Lewis adduct, such as $ZnCl_2$, $Mg(ClO_4)_2$, $Sn[N(SO_2\text{-}n\text{-}C_8F_{17})_2]_4$.

In one embodiment, the adhesive composition comprises a catalyst selected from metal chlorides, such as KCl, $MgCl_2$, $ZnCl_2$, $FeCl_3$ and $SnCl_2$ or their adducts such as $AlCl_3$ adducts, such as $BF_3$ adducts, such as $BF_3$ ethylamine complex.

In one embodiment, the adhesive composition comprises a catalyst selected from organometallic compounds, such as titanate-based catalysts and stannum based catalysts.

In one embodiment, the adhesive composition comprises a catalyst selected from chelating agents, such as transition metals, such as iron ions, chromium ions, manganese ions, copper ions and/or from peroxides such as organic peroxides such as dicumyl peroxide.

In one embodiment, the adhesive composition according to the present invention comprises a catalyst selected from phosphites such as alkyl phosphites, such as aryl phosphites such as triphenyl phosphite.

In one embodiment, the adhesive composition according to the present invention comprises a catalyst selected from the group of ternary amines such as tris-2,4,6-dimethylaminomethyl phenol.

In one embodiment, the adhesive composition further comprises a further component (iv) in form of one or more silanes.

In one embodiment, the adhesive composition comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea funtionalised silanes or vinyl functionalized silanes.

In one embodiment, the adhesive composition further comprises a component (v) in form of one or more components selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof.

In one embodiment, the adhesive composition further comprises a further component in form of urea, in particular in an amount of 5 to 40 wt.-%, such as 10 to 30 wt.-%, 15 to 25 wt.-%, based on the dry weight of component (i).

In one embodiment, the adhesive composition comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the adhesive composition comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In one embodiment, the adhesive composition comprises a further component in form of one or more silicone resins.

In one embodiment, the adhesive composition according to the present invention comprises a further component (vi) in the form of one or more reactive or nonreactive silicones.

In one embodiment, the component (vi) is selected from the group consisting of silicone constituted of a main chain composed of organosiloxane residues, especially diphenylsiloxane residues, alkylsiloxane residues, preferably dimethylsiloxane residues, bearing at least one hydroxyl, carboxyl or anhydride, amine, epoxy or vinyl functional group capable of reacting with at least one of the constituents of the adhesive composition and is preferably present in an amount of 0.025-15 weight-%, preferably from 0.1-10 weight-%, more preferably 0.3-8 weight-%, based on the adhesive solids.

In one embodiment, the adhesive composition comprises a further component in form of one or more mineral oils.

In the context of the present invention, an adhesive composition having a sugar content of 50 wt.-% or more, based on the total dry weight of the adhesive components, is considered to be a sugar based adhesive. In the context of the present invention, a adhesive composition having a sugar content of less than 50 wt.-%, based on the total dry weight of the adhesive components, is considered a non-sugar based adhesive.

In one embodiment, the adhesive composition comprises a further component in form of one or more surface active agents that are in the form of non-ionic and/or ionic emulsifiers such as polyoxyethylenes (4) lauryl ether, such as soy lecithin, such as sodium dodecyl sulfate.

The use of lignin-based sulfonated products in adhesives may result in an increase in the hydrophilicity of some adhesive s and final products, meaning one or more hydrophobic agents are to be added, such as one or more mineral oils, such as one or more silicone oil, such as one or more silicone resin.

In one embodiment, the aqueous adhesive composition consists essentially of

- a component (i) in form of one or more lignins selected from the group of:
  - lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
  - and/or
- a component (ii) in form of one or more cross-linkers;
- a component (iii) in form of one or more plasticizers;
- a component (iv) in form of one or more coupling agents, such as organofunctional silanes;
- optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;
- optionally a component in form of urea;
- optionally a component in form of a more reactive or non-reactive silicones;
- optionally a hydrocarbon oil;
- optionally one or more surface active agents;
- water.

In one embodiment, the aqueous adhesive composition consists essentially of

- a component (i) in form of one or more lignins selected from the group of:
  - lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
  - and/or
- a component (ii) in form of one or more cross-linkers;
- a component (iv) in form of one or more coupling agents, such as organofunctional silanes;
- optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;
- optionally a component in form of urea;
- optionally a component in form of a more reactive or non-reactive silicones;
- optionally a hydrocarbon oil;
- optionally one or more surface active agents;
- water.

The present inventors have surprisingly found that mineral fibre products (such as acoustic products of the present invention) comprising an aqueous adhesive composition as it is described above when used as a binder in the mineral fibre products have a very high stability, both when freshly produced and after aging conditions.

Further, the present inventors have found that even higher product stability can be obtained by using a curing temperature of >230° C.

The present inventors have further found that the stability of the product can be further increased by the following measures:

- Lower line capacity, meaning longer curing time
- Addition of silicone resins
- Addition of high amounts of crosslinker
- Addition of a combination of two or more different crosslinkers
- Addition of small amounts of cationic species such as multivalent metal ions such as calcium and/or organic cationic species such as amines and/or organically modified inorganic compounds such as amine modified montmorillonite clays When the acoustic product comprises mineral fibres they may be any man-made vitreous fibres (MMVF), such as glass fibres, ceramic fibres, basalt fibres, slag fibres, rock fibres, stone fibres and others. These fibres may be present as a wool product, e.g. like a stone wool product.

Fibre/Melt Composition

The man-made vitreous fibres (MMVF) can have any suitable oxide composition. The fibres can be glass fibres, ceramic fibres, basalt fibres, slag fibres or rock or stone fibres. The fibres are preferably of the types generally known as rock, stone or slag fibres, most preferably stone fibres.

Stone fibres commonly comprise the following oxides, in percent by weight:

$SiO_2$: 30 to 51
$Al_2O_3$: 12 to 30
CaO: 8 to 30
MgO: 2 to 25
FeO (including $Fe_2O_3$): 2 to 15
$Na_2O+K_2O$: not more than 10
CaO+MgO: 10 to 30

In preferred embodiments the MMVF have the following levels of elements, calculated as oxides in wt %:

$SiO_2$: at least 30, 32, 35 or 37; not more than 51, 48, 45 or 43
$Al_2O_3$: at least 12, 16 or 17; not more than 30, 27 or 25
CaO: at least 8 or 10; not more than 30, 25 or 20
MgO: at least 2 or 5; not more than 25, 20 or 15
FeO (including $Fe_2O_3$): at least 4 or 5; not more than 15, 12 or 10
FeO+MgO: at least 10, 12 or 15; not more than 30, 25 or 20
$Na_2O+K_2O$: zero or at least 1; not more than 10
CaO+MgO: at least 10 or 15; not more than 30 or 25
$TiO_2$: zero or at least 1; not more than 6, 4 or 2
$TiO_2$+FeO: at least 4 or 6; not more than 18 or 12
$B_2O_3$: zero or at least 1; not more than 5 or 3
$P_2O_5$: zero or at least 1; not more than 8 or 5
Others: zero or at least 1; not more than 8 or 5

The MMVF used in the invention preferably have the composition in wt.-%:

| | |
|---|---|
| $SiO_2$ | 35 to 50 |
| $Al_2O_3$ | 12 to 30 |
| $TiO_2$ | up to 2 |
| $Fe_2O_3$ | 3 to 12 |
| CaO | 5 to 30 |
| MgO | up to 15 |
| $Na_2O$ | 0 to 15 |
| K2O | 0 to 15 |
| $P_2O_5$ | up to 3 |
| MnO | up to 3 |
| $B_2O_3$ | up to 3 |

Another preferred composition for the MMVF is as follows in wt %:

$SiO_2$ 39-55% preferably 39-52%
$Al_2O_3$ 16-27% preferably 16-26%
CaO 6-20% preferably 8-18%
MgO 1-5% preferably 1-4.9%
$Na_2O$ 0-15% preferably 2-12%
$K_2O$ 0-15% preferably 2-12%
$R_2O$ ($Na_2O+K_2O$) 10-14.7% preferably 10-13.5%
$P_2O_5$ 0-3% preferably 0-2%
$Fe_2O_3$ (iron total) 3-15% preferably 3.2-8%
$B_2O_3$ 0-2% preferably 0-1%
$TiO_2$ 0-2% preferably 0.4-1%
Others 0-2.0%

Glass fibres commonly comprise the following oxides, in percent by weight:

$SiO_2$: 50 to 70
$Al_2O_3$: 10 to 30
CaO: not more than 27
MgO: not more than 12

Glass fibres can also contain the following oxides, in percent by weight:

$Na_2O+K_2O$: 8 to 18, in particular $Na_2O+K_2O$ greater than CaO+MgO
$B_2O_3$: 3 to 12

Some glass fibre compositions can contain $Al_2O_3$: less than 2%.

ADHESIVE EXAMPLES

In the following examples, several adhesives which fall under the definition of the adhesive used in the present invention were prepared and compared to adhesives according to the prior art.

The following properties were determined for the adhesives used in the present invention and the adhesives according to the prior art, respectively:

Adhesive Component Solids Content

The content of each of the components in a given adhesive solution before curing is based on the anhydrous mass of the components.

Lignosulfonates were supplied by Borregaard, Norway and LignoTech, Florida as liquids with approximately 50% solid content. Primid XL552 was supplied by EMS-CHEMIE AG, Silane (Momentive VS-142 40% activity), was supplied by Momentive and was calculated as 100% for simplicity. Silicone resin BS 1052 was supplied by Wacker Chemie AG. NH4OH 24.7% was supplied by Univar and used in supplied form. PEG 200, urea, KOH pellets, 1,1,1 tris(hydroxymethyl)propane were supplied by Sigma-Aldrich and were assumed anhydrous for simplicity.

Adhesive Solids

The content of adhesive after curing is termed "adhesive solids".

Disc-shaped stone wool samples (diameter: 5 cm; height 1 cm) were cut out of stone wool and heat-treated at 580° C. for at least 30 minutes to remove all organics. The solids of the adhesive mixture was measured by distributing a sample of the adhesive mixture (approx. 2 g) onto a heat treated stone wool disc in a tin foil container. The weight of the tin foil container containing the stone wool disc was weighed before and directly after addition of the adhesive mixture. Two such adhesive mixture loaded stone wool discs in tin foil containers were produced and they were then heated at 200° C. for 1 hour. After cooling and storing at room temperature for 10 minutes, the samples were weighed and the adhesive solids was calculated as an average of the two results. A adhesive with a desired adhesive solids could then be produced by diluting with the required amount of water and 10% aq. silane (Momentive VS-142).

Mechanical Strength Studies

Bar Tests

The mechanical strength of the adhesives (when tested as binder for a MMVF matrix) was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured typically at 225° C. The curing time was 1 h. After cooling to room temperature, the bars were carefully taken out of the containers. Five of the bars were aged in a water bath at 80° C. for 3 h. This method of curing the prepared bars was used for example in Tables 1.1, 1.2, 1.4, 1.5, 1.6. Results in Table 1.3 are based on a slightly different method which includes a preconditioning step of 2 h at 90° C., followed by curing for 1 h at 225° C. while the remaining of the procedure is the same.

After drying for 3 days, the aged bars as well as five unaged bars were broken in a 3 point bending test (test speed: 10.0 mm/min, rupture level: 50%; nominal strength: 30 $N/mm^2$; support distance: 40 mm; max deflection 20 mm; nominal e-module 10000 $N/mm^2$) on a Bent Tram machine to investigate their mechanical strengths. The bars were placed with the "top face" up (i.e. the face with the dimensions length=5.6 cm, width=2.5 cm) in the machine.

Adhesive Example, Reference Adhesive (Phenol-Formaldehyde Resin Modified with Urea, a PUF-Resol)

This adhesive is a phenol-formaldehyde resin modified with urea, a PUF-resol.

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a adhesive can be diluted with acid without the mixture becoming cloudy (the adhesive precipitates). Sulfuric acid is used to determine the stop criterion in a adhesive production and an acid tolerance lower than 4 indicates the end of the adhesive reaction.

To measure the AT, a titrant is produced from diluting 2.5 ml conc. sulfuric acid (>99%) with 1 L ion exchanged water. 5 mL of the adhesive to be investigated is then titrated at room temperature with this titrant while keeping the adhesive in motion by manually shaking it; if preferred, use a magnetic stirrer and a magnetic stick. Titration is continued until a slight cloud appears in the adhesive, which does not disappear when the adhesive is shaken.

The acid tolerance (AT) is calculated by dividing the amount of acid used for the titration (mL) with the amount of sample (mL):

$$AT=(\text{Used titration volume}(mL))/(\text{Sample volume }(mL))$$

Using the urea-modified phenol-formaldehyde resin obtained, a adhesive is made by addition of 25% aq. ammonia (90 mL) and ammonium sulfate (13.2 g) followed by water (1.30 kg).

The adhesive solids were then measured as described above and the mixture was diluted with the required amount of water and silane for mechanical measurements (15% adhesive solids solution, 0.5% silane of adhesive solids).

Adhesive Example, Reference Adhesive (Adhesive Based on Alkali Oxidized Lignin)

3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown adhesive. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C. Then addition of 307.5 kg 35% hydrogen peroxide is started. The hydrogen peroxide is dosed at a rate of 200-300 l/h. First half of the hydrogen peroxide is added at a rate of 200 l/h where after the dosage rate is increased to 300 l/h.

During the addition of hydrogen peroxide is the temperature in the reaction mixture controlled by heating or cooling in such a way that a final reaction temperature of 65° C. is reached.

The final product was analysed for the COOH group content, dry solid matter, pH, viscosity and remaining $H_2O_2$ 0.60 g of this oxidized lignin (18.2% solids) was mixed with 1.4 g Primid XL552 (100% solids) and 2.8 g PEG200 (100% solids). 0.6 g Silane (Momentive VS-142 40% activity, 10% in water) and 17.4 g water were added and mixed to yield 15% solids and then used for test of mechanical properties in bar tests.

Adhesive Compositions for Use in the Present Invention

In the following, the entry numbers of the adhesive example correspond to the entry numbers used in Table 1-1 to 1-6.

The carboxylic acid group content of all lignosulfonates used for the adhesives according to the present invention was measured using $^{31}P$ NMR and was found to be in the range of 0.05 to 0.6 mmol/g, based on the dry weight of the lignosulfonate lignins, for all examples.

Example 2

To 30.0 g lignosulfonate solution (50% solids), 0.4 g NH4OH (24.7%) was added and mixed followed by addition of 1.9 g Primid XL552 (100% solids) and mixing. Finally, 0.7 g Silane (Momentive VS-142 40% activity, 10% in water) and 64.3 g water were added and mixed to yield 15% solids and then used for test of mechanical properties in bar tests.

Example 11

To 30.0 g lignosulfonate solution (50% solids), 0.4 g NH4OH (24.7%) was added and mixed followed by addition of 2.1 g Primid XL552 (100% solids) and 3.4 g PEG 200 (100% solids) and mixing. Finally, 0.7 g Silane (Momentive VS-142 40% activity, 10% in water) and 61.8 g water were added and mixed to yield 15% solids and then used for test of mechanical properties in bar tests.

Example 15

To 30.0 g lignosulfonate solution (50% solids), 0.4 g NH4OH (24.7%) was added and mixed followed by addition of 2.9 g Primid XL552 (100% solids) and 3.4 g PEG 200 (100% solids) and mixing. Finally, 0.8 g Silane (Momentive VS-142 40% activity, 10% in water) and 67 g water were added and mixed to yield 15% solids and then used for test of mechanical properties in bar tests.

Example 30

To 30.0 g lignosulfonate solution (50% solids), 0.4 g NH4OH (24.7%) was added and mixed followed by addition of 2.9 g Primid XL552 (100% solids) and 3.4 g 1,1,1 tris(hydroxymethyl)propane (100% solids) and mixing. Finally, 0.8 g Silane (Momentive VS-142 40% activity, 10% in water) and 67 g water were added and mixed to yield 15% solids and then used for test of mechanical properties in bar tests.

Example 33

To 100.0 g lignosulfonate solution (50% solids), 0.3 g KOH in pellet form was added and mixed followed by addition of 10.8 g Primid XL552 (100% solids) and 11.3 g PEG 200 (100% solids) and mixing. Finally, 2.6 g Silane (Momentive VS-142 40% activity, 10% in water) and 228 g water were added and mixed to yield 15% solids and then used for test of mechanical properties in bar tests.

Example 41

To 30.0 g lignosulfonate solution (50% solids), 0.4 g NH4OH (24.7%) was added and mixed followed by addition of 1.9 g Primid XL552 (100% solids) and 1.7 g PEG 200 (100% solids) and 1.7 g urea (100% solids) and mixing. Finally, 0.7 g Silane (Momentive VS-142 40% activity, 10% in water) and 60.5 g water were added and mixed to yield 15% solids and then used for test of mechanical properties in bar tests.

Mechanical properties are presented in Tables 1.1-1.6. For simplicity, quantities of all other components are recalculated based on 100 g of dry lignin.

As can be seen from Table 1.1 a combination of cross-linker (Primid XL 552) and plasticizer (PEG 200) is required to achieve high mechanical properties (unaged and aged strength in bar test) that are at comparable level to reference adhesive (11 and 15 versus 2 and 9 versus reference adhesive).

Table 1.2 and 1.3 show that different plasticizers can be used (13 and 15 versus 30) or combination of plasticizers (34 versus 41) and that the PEG 200 is a preferred plasticizer.

Table 1.4 shows that addition of silane can help achieve aged strength on the same level as reference adhesives.

Table 1.5 shows that the adhesive has high strength without the presence of a base but that a non-permanent base ($NH_4OH$) or a permanent base (KOH) can be added to the formulation to protect the production equipment from corrosion without significant changes in strength.

Table 1.6 shows that different lignosulfonates can be used.

This overall means, we are able to produce a mineral wool product based on a phenol and formaldehyde-free adhesive composition with a high content of renewable material based on lignin, which has comparable mechanical properties to the reference systems and can be produced in a simpler and less expensive way.

TABLE 1.1

| | Reference adhesive (Phenol-formaldehyde resin modified with urea, a PUF-resol) | Reference adhesive (adhesive based on alkali oxidized lignin) | 1 | 2 | 8 | 9 | 10 | 11 | 15 |
|---|---|---|---|---|---|---|---|---|---|
| Adhesive composition | | | | | | | | | |
| ammonium lignosulfonate (g dry lignin) | | | 100 | 100 | 100 | 100 | 100 | 100 | 100 |
| ammonium calcium lignosulfonate (g dry lignin) | | | | | | | | | |
| PEG 200 (g) | | | 0 | 0 | 23 | 40 | 23 | 23 | 23 |
| 1,1,1 tris(hydroxymethyl)propane (g) | | | | | | | | | |
| urea (g) | | | | | | | | | |
| NH4OH (g) | | | 0.8 | 0.8 | 0.8 | 0.8 | 0.8 | 0.8 | 0.8 |
| KOH (g) | | | | | | | | | |
| Primid XL552 (g) | | | 0 | 14 | 0 | 0 | 7 | 14 | 20 |
| Momentive VS 142 (% of adhesive solids), based on 40% activity | | | 0.5 | 0.5 | 0.5 | 0.5 | 0.5 | 0.5 | 0.5 |
| Properties | | | | | | | | | |
| Mechanical strength, unaged (N), bars tests | 350 | 270 | 60 | 280 | 70 | 150 | 110 | 230 | 320 |
| Mechanical strength, aged (N), bar tests | 150 | 130 | 0 | 50 | 20 | 40 | 50 | 140 | 130 |
| Curing temp, ° C. | 200 | 225 | 225 | 225 | 225 | 225 | 225 | 225 | 225 |

TABLE 1.2

| | 12 | 13 | 15 | 26 | 27 | 28 | 29 | 30 |
|---|---|---|---|---|---|---|---|---|
| Adhesive composition | | | | | | | | |
| ammonium lignosulfonate (g dry lignin) | 100 | 100 | 100 | 100 | 100 | 100 | 100 | 100 |
| ammonium calcium lignosulfonate (g dry lignin) | | | | | | | | |
| PEG 200 (g) | 23 | 23 | 23 | | | | | |
| 1,1,1 tris(hydroxymethyl)propane (g) | | | | 23 | 23 | 40 | 23 | 23 |
| urea (g) | | | | | | | | |
| Primid XL552 (g) | 13 | 13 | 20 | 0 | 0 | 0 | 20 | 20 |
| NH4OH (g) | 0.8 | 0.8 | 0.8 | 0.8 | 0.8 | 0.8 | 0.8 | 0.8 |
| KOH (g) | | | | | | | | |
| Momentive VS 142 (% of adhesive solids), based on 40% activity | 0 | 0.5 | 0.5 | 0 | 0.5 | 0.5 | 0 | 0.5 |
| Adhesive properties | | | | | | | | |
| Mechanical strength, unaged (N), bars tests | 250 | 250 | 320 | 80 | 90 | 90 | 200 | 210 |
| Mechanical strength, aged (N), bar tests | 30 | 110 | 130 | 10 | 10 | 20 | 60 | 100 |
| Curing temp, ° C. | 225 | 225 | 225 | 225 | 225 | 225 | 225 | 225 |

TABLE 1.3

| Adhesive composition | 34 | 36 | 39 | 40 | 41 |
|---|---|---|---|---|---|
| ammonium lignosulfonate (g dry lignin) | 100 | 100 | 100 | 100 | 100 |
| ammonium calcium lignosulfonate (g dry lignin) | | | | | |
| PEG 200 (g) | 23 | 12 | 4.5 | 0 | 12 |
| 1,1,1 tris(hydroxymethyl)propane (g) | | | | | |
| urea (g) | | | | | 12 |
| Primid XL552 (g) | 13 | 13 | 13 | 13 | 13 |
| NH4OH (g) | 0.8 | 0.8 | 0.8 | 0.8 | 0.8 |
| KOH (g) | | | | | |
| Momentive VS 142 (% of adhesive solids), based on 40% activity | 0.5 | 0.5 | 0.5 | 0.5 | 0.5 |
| Adhesive properties | | | | | |
| Mechanical strength, unaged (N), bars tests | 150 | 150 | 140 | 60 | 135 |
| Mechanical strength, aged (N), bar tests | 60 | 50 | 40 | 20 | 40 |
| Curing temp, ° C. | 225 | 225 | 225 | 225 | 225 |

TABLE 1.4

| | 12 | 13 | 14 | 15 | 29 | 30 |
|---|---|---|---|---|---|---|
| Adhesive composition | | | | | | |
| ammonium lignosulfonate (g dry lignin) | 100 | 100 | 100 | 100 | 100 | 100 |
| ammonium calcium lignosulfonate (g dry lignin) | | | | | | |
| PEG 200 (g) | 23 | 23 | 23 | 23 | | |
| 1,1,1 tris(hydroxy-methyl)propane (g) | | | | | 23 | 23 |
| urea (g) | | | | | | |
| Primid XL552 (g) | 13 | 13 | 20 | 20 | 20 | 20 |

TABLE 1.4-continued

| | 12 | 13 | 14 | 15 | 29 | 30 |
|---|---|---|---|---|---|---|
| NH4OH (g) | 0.8 | 0.8 | 0.8 | 0.8 | 0.8 | 0.8 |
| KOH (g) | | | | | | |
| Momentive VS 142 (% of adhesive solids), based on 40% activity | 0 | 0.5 | 0 | 0.5 | 0 | 0.5 |
| Adhesive properties | | | | | | |
| Mechanical strength, unaged (N), bars tests | 250 | 250 | 380 | 320 | 200 | 210 |
| Mechanical strength, aged (N), bar tests | 30 | 110 | 40 | 130 | 60 | 100 |
| Curing temp, ° C. | 225 | 225 | 225 | 225 | 225 | 225 |

TABLE 1.5

| Adhesive composition | 31 | 32 | 33 |
|---|---|---|---|
| ammonium lignosulfonate (g dry lignin) | 100 | 100 | 100 |
| ammonium calcium lignosulfonate (g dry lignin) | | | |
| PEG 200 (g) | 23 | 23 | 23 |
| 1,1,1 tris(hydroxymethyl)propane (g) | | | |
| urea (g) | | | |

TABLE 1.5-continued

| Adhesive composition | 31 | 32 | 33 |
|---|---|---|---|
| Primid XL552 (g) | 22 | 22 | 22 |
| NH4OH (g) | 0 | 1.0 | 0 |
| KOH (g) | 0 | 0 | 0.6 |
| Momentive VS 142 (% of adhesive solids), based on 40% activity | 0.5 | 0.5 | 0.5 |
| Adhesive properties | | | |
| Mechanical strength, unaged (N), bars tests | 330 | 300 | 290 |
| Mechanical strength, aged (N), bar tests | 160 | 120 | 130 |
| Curing temp, ° C. | 225 | 225 | 225 |

TABLE 1.6

| Adhesive composition | 11 | 15 | 45 | 46 |
|---|---|---|---|---|
| ammonium lignosulfonate (g dry lignin) | 100 | 100 | | |
| ammonium calcium lignosulfonate (g dry lignin) | | | 100 | 100 |
| PEG 200 (g) | 23 | 23 | 23 | 23 |
| 1,1,1 tris(hydroxymethyl)propane (g) | | | | |
| urea (g) | | | | |
| Primid XL552 (g) | 13 | 20 | 13 | 20 |
| NH4OH (g) | 0.8 | 0.8 | 0.8 | 0.8 |
| KOH (g) | | | | |
| Momentive VS 142 (% of adhesive solids), based on 40% activity | 0.5 | 0.5 | 0.5 | 0.5 |
| Adhesive properties | | | | |
| Mechanical strength, unaged (N), bar tests | 230 | 320 | 210 | 300 |
| Mechanical strength, aged (N), bar tests | 140 | 130 | 120 | 130 |
| Curing temp, ° C. | 225 | 225 | 225 | 225 |

Examples 47-50

In the following, the entry numbers of the adhesive example correspond to the entry numbers used in Table 2.

The carboxylic acid group content of all lignosulfonates used for the adhesives according to the present invention was measured using 31P NMR and was found to be in the range of 0.05 to 0.6 mmol/g, based on the dry weight of the lignosulfonate lignins, while it was found for this specific batch used for examples 47, 48, 49, 50, 51, 52, 53, 54 to be 0.14 mmol/g.

Example 47

To 30.0 g lignosulfonate solution (50% solids), 0.4 g NH4OH (24.7%) was added and mixed followed by addition of 0.7 g Silane (Momentive VS-142 40% activity, 10% in water) and 68.9 g water were added and mixed to yield 15% solids and then used for test of mechanical properties in bar tests.

Example 49

To 30.0 g lignosulfonate solution (50% solids), 0.4 g NH4OH (24.7%) was added and mixed followed by addition of 6.0 g Primid XL552 (100% solids) and mixing. Finally, 1.0 g Silane (Momentive VS-142 40% activity, 10% in water) and 102.6 g water were added and mixed to yield 15% solids and then used for test of mechanical properties in bar tests.

Mechanical properties are presented in Table 2. For simplicity, quantities of all other components are recalculated based on 100 g of dry lignin.

As can be seen from Table 2, in a combination of lignosulfonate and crosslinker (Primid XL 552) higher amounts of crosslinker lead to better mechanical properties.

TABLE 2

| Adhesive composition | PUF ref | 47 | 48 | 49 | 50 |
|---|---|---|---|---|---|
| ammonium lignosulfonate (g solids) | | 100 | 100 | 100 | 100 |
| PEG 200 (g) | | 0 | 0 | 0 | 0 |
| urea (g) | | | | | |
| ammonia, 24.7% (g) | | 2.5 | 2.5 | 2.5 | 2.5 |
| Primid XL552 (g) | | 0 | 25 | 40 | 60 |
| Momentive VS 142 (% of adhesive solids), based on 40% activity | | 0.5 | 0.5 | 0.5 | 0.5 |
| Properties | | | | | |
| Mechanical strength, unaged (N), bars tests | 350 | 60 | 280 | 460 | 640 |
| Mechanical strength, aged (N), bars tests | 150 | 0 | 160 | 180 | 230 |
| Curing temp, ° C. | 200 | 225 | 225 | 225 | 225 |

Figure 1:
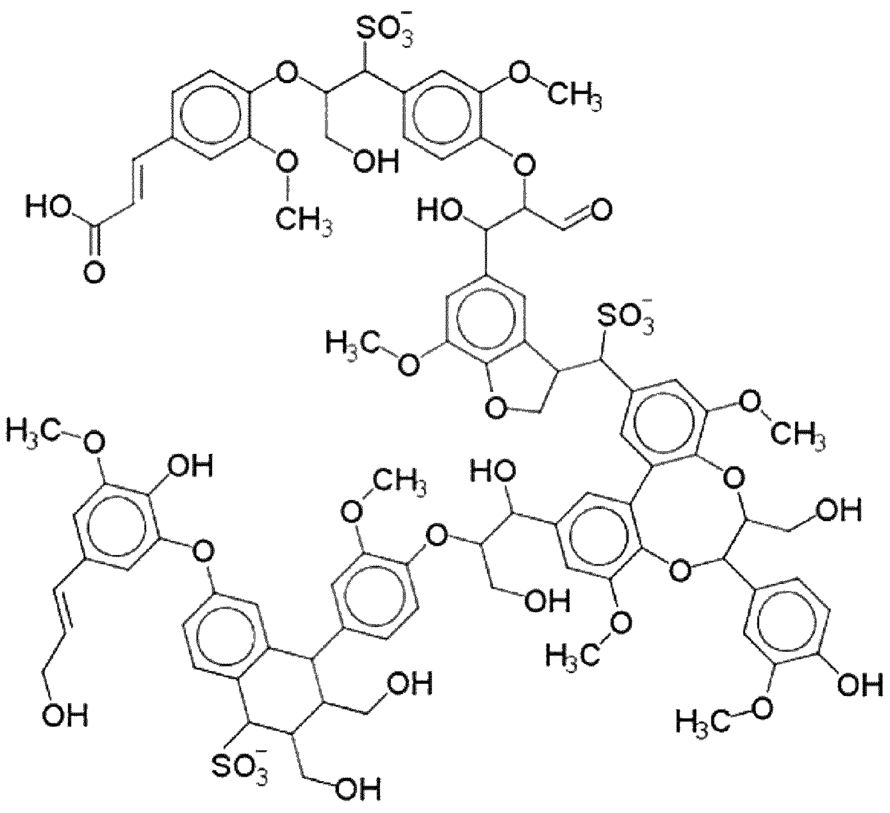
FIG. 1 shows a commonly used model structure of lignosulfonates.
Figure 2:
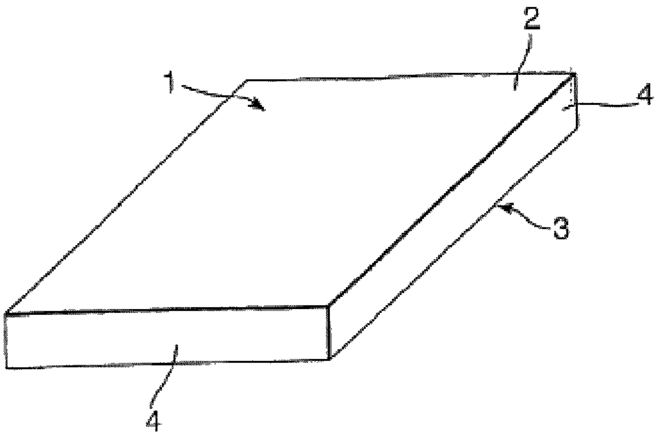
FIG. 2 is a perspective view of an acoustic product according to the invention.

The acoustic product 1 of FIG. 2 has a smooth, flat, sound-absorbing front face 2 extending in what is referred to as the XY plane, a back face 3 and side edges 4 extending in the Z direction between the front and rear faces. The acoustic product consists of an acoustic element which is a bonded MMVF matrix, together with a facing on the front face 2 and also on the rear face 3. The side edges 4 may be square or may have some other profile.

Figure 3:
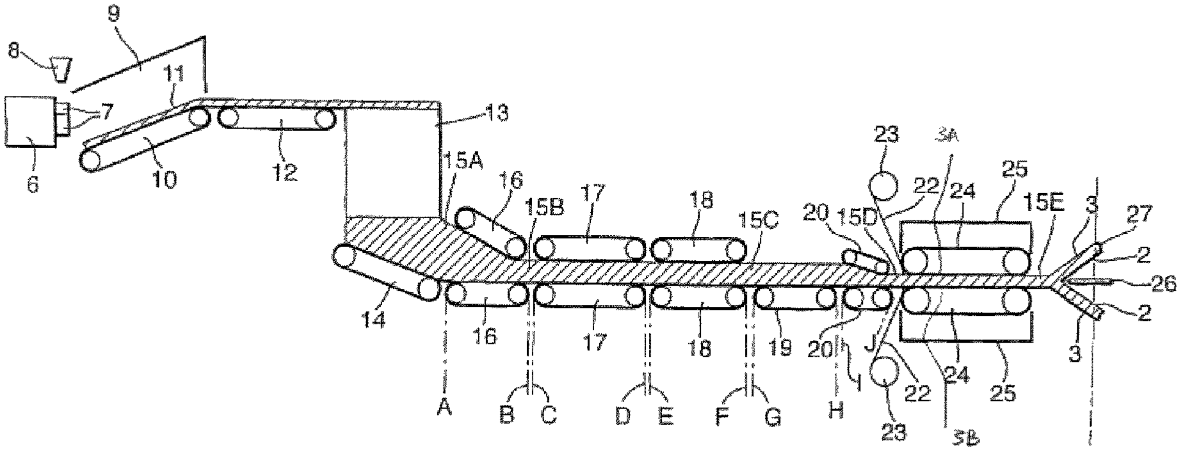
FIG. 3 is a diagrammatic illustration of a method of the invention up to the curing oven stage.

As shown in FIG. 3, a typical apparatus for making the product comprises a cascade spinner 6 having a plurality of rotors 7 mounted on the front face positioned to receive melt from a melt gutter 8 whereby melt which falls on to the rotors is thrown from one rotor to the next and from the rotors as fibres. These fibres are entrained in air from in and around the rotors 7 whereby the fibres are carried forward into a collecting chamber 9 having a perforated collector conveyor 10 in its base. Air is sucked through the collector and a web 11 forms on the collector and is carried out of the collecting chamber 9 and on to another conveyor 12. The primary web 11 is led by conveyor 12 into the top of a cross-lapping pendulum 13 by which layers of the primary web are cross-lapped on one another as they are collected as a secondary web 15A beneath the pendulum on conveyor 14.

The secondary web 15A is led by conveyor 14 to a pair of conveyors 16 for applying vertical compression to the secondary web from its natural depth, at point A, to its compressed depth at point B. The secondary web at point A has a weight per unit area of W.

The compressed secondary web 15B is transferred from point C to point D by conveyors 17. Conveyors 16 and 17 usually all travel at substantially the same speed so as to establish a constant speed of travel of the secondary web from the vertical compression stage AB to point D.

The web is then transported between a pair of conveyors 18 which extend between points E and F. Conveyors 18 travel much more slowly than conveyors 16 and 17 so that longitudinal compression is applied between points D and F.

Although items 14, 16, 17 and 18 are shown for clarity as conveyor belts spaced apart from one another in the X direction, in practice they are normally very close to one another in the X direction.

Points D and E are preferably sufficiently close to one another or are interconnected by bands, to prevent the secondary web escaping from the desired line of travel. As a result, substantial longitudinal compression has occurred when the web emerges at point F. Restraining guides can be provided, if necessary, between D and E to prevent break out of the web if D and E are not close together.

The resultant longitudinally compressed batt 15C is then carried along conveyor 19 between points G and H at a higher speed than by the conveyors 18. This applies some longitudinal decompression or extension to the longitudinally compressed web and prevents the web breaking out from the desired line of travel and, for instance, buckling upwards due to internal forces within the web. If desired or necessary, a conveyor or other guide (not shown) may rest on the upper surface of the batt (above conveyor 19) so as to ensure that there is no breakout.

When vertical compression is to be applied to the longitudinally compressed web, this is done by passing the web, after it leaves point H, between conveyors 20, which converge so as to compress the web vertically as it travels between the conveyors and points I and J.

The resultant uncured batt 15D has first and second major faces 3A and 3B. A glass fibre veil 22 from rolls 23 is then contacted with faces 3A and 3B. The glass veil 22 has been provided with adhesive as required by the invention, to bond the veil to the batt. The resultant assembly then passes through a curing oven 25 where just sufficient pressure is applied by conveyors 24 to hold the sandwich of two layers of veil 22 and the batt 15D together while curing of the binder for the MMVF and the adhesive occurs.

Figure 4:
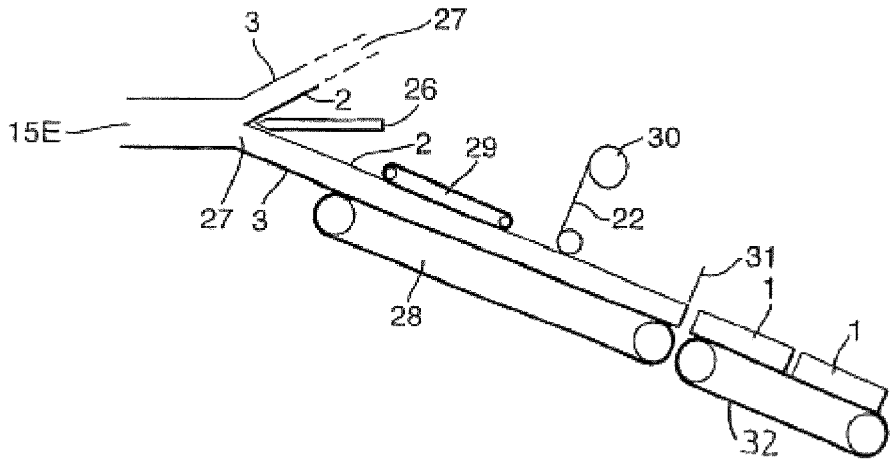
FIG. 4 is a diagrammatic continuation of FIG. 6 beyond the curing oven.

The bonded batt 15E emerges from the curing oven and is sliced centrally by a band saw 26 or other suitable saw into two cut batts 27 each having an outer face 3 carrying the veil 22 and an inner cut face 2 (See FIG. 4). Each cut batt 27 is supported on a conveyor 28 and travels beneath an abrading belt 29 where it is abraded or ground to a flat configuration, and a further facing 22 is applied from roll 30 and bonded to the abraded surface 2. The abraded or ground cut batt 27 is then divided by appropriate cutters 31 into individual batts 1 which are carried away on conveyor 32.

Paint may be applied to either or both faces.

Throughout this description, conveyor bands or belts are illustrated but any or all of the conveyors can be replaced by any suitable means of causing the relevant transport with acceleration, deceleration or vertical compression as required. For instance roller trains may be used instead of belts.

EXAMPLES

Example I—Peel Strength

A fleece (Johns Manville Glass fiber nonwoven Evalith DH 50/20) was cut into 3 cm wide strands. An adhesive was applied onto the fleece by a roller at 40 g/m$^2$ loading level. The fleece with the adhesive was pressed onto a finished MMVF product that has 145 kg/m$^3$ density with 2500 Pa of pressure and cured at 200 to 225° C. for 45 minutes. The binder in the MMVF product was made as follows:

730.0 kg of ammonium lignosulfonate was placed in a mixing vessel to which 8.5 l NH4OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water) and 40 kg silicone (Wacker BS 1052, 12% in water). Curing oven temperature was set to 275° C.

After curing of the adhesive, the product was left to cool down at room temperature for 2 hours and the adhesion strength was measured. The measurement was done by pulling the end edge of the fleece strand in a tensile direction perpendicular to the surface of the MMVF product with Mecmesin force gauge and adhesion strength is expressed in grams.

This method was carried out for four different adhesives to bind the fleece to the MMVF product.

Adhesive 1, according to the invention, was made as follows:

To 200.0 g lignosulfonate solution (50% solids), 2.5 g NH4OH (24.7%) was added and mixed followed by addition by addition of 20.0 g Primid XL552 (100% solids), and 23.0 g PEG 200 (100% solids) and mixing. Finally, 120.3 g water was added and mixed to yield 35% solids and then used for testing the adhesion.

Comparative Adhesive 1 is made as follows (PUF adhesive):

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a adhesive can be diluted with acid without the mixture becoming cloudy (the adhesive precipitates). Sulfuric acid is used to determine the stop criterion in a adhesive production and an acid tolerance lower than 4 indicates the end of the adhesive reaction.

To measure the AT, a titrant is produced from diluting 2.5 ml conc. sulfuric acid (>99%) with 1 L ion exchanged water. 5 mL of the adhesive to be investigated is then titrated at room temperature with this titrant while keeping the adhesive in motion by manually shaking it; if preferred, use a magnetic stirrer and a magnetic stick. Titration is continued until a slight cloud appears in the adhesive, which does not disappear when the adhesive is shaken.

The acid tolerance (AT) is calculated by dividing the amount of acid used for the titration (mL) with the amount of sample (mL):

$$AT = (\text{Used titration volume}(mL))/(\text{Sample volume}(mL))$$

Using the urea-modified phenol-formaldehyde resin obtained, an adhesive is made by addition of 25% aq. ammonia (90 mL) and ammonium sulfate (13.2 g) followed by water (1.30 kg).

The adhesive solids were then measured as described above and the mixture was diluted with the required amount of water and silane (15% adhesive solids solution, 0.5% silane of adhesive solids).

Comparative adhesive 2 is made as follows (lignin based adhesive):

3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown adhesive. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C. Then addition of 307.5 kg 35% hydrogen peroxide is started. The hydrogen peroxide is dosed at a rate of 200-300 l/h. First half of the hydrogen peroxide is added at a rate of 200 l/h where after the dosage rate is increased to 300 l/h.

During the addition of hydrogen peroxide is the temperature in the reaction mixture controlled by heating or cooling in such a way that a final reaction temperature of 65° C. is reached.

The final product was analysed for the COOH group content, dry solid matter, pH, viscosity and remaining $H_2O_2$ 0.60 g of this oxidized lignin (18.2% solids) was mixed with 1.4 g Primid XL552 (100% solids) and 2.8 g PEG200 (100% solids). 0.6 g Silane (Momentive VS-142 40% activity, 10% in water) and 17.4 g water were added and mixed to yield 15% solids.

Comparative adhesive 3 is made as follows (formaldehyde free, sugar-based adhesive).

A mixture of 75.1% aq. glucose syrup (19.98 g; thus efficiently 15.0 g glucose syrup), 50% aq. hypophosphorous acid (0.60 g; thus efficiently 0.30 g, 4.55 mmol hypophosphorous acid) and sulfamic acid (0.45 g, 4.63 mmol) in water (30.0 g) was stirred at room temperature until a clear solution was obtained.

28% aq. ammonia (0.80 g; thus efficiently 0.22 g, 13.15 mmol ammonia) was then added dropwise until pH=7.9. The adhesive solids was then measured (21.2%).

The binder mixture was diluted with water (0.403 g/g binder mixture) and 10% aq. silane (0.011 g/g binder mixture, Momentive VS-142). The final binder mixture for mechanical strength studies had pH=7.9.

The results are shown in Table I. As can be seen from Table I, when the adhesive of the invention is used to glue the fleece to the MMVF product, the peel strength is slightly less than PUF but is improved in comparison to comparative formaldehyde free binders.

TABLE I

| adhesive | adhesive 1 | Comparative adhesive 3 (formaldehyde free) | Comparative adhesive 2 (lignin) | Comparative adhesive 1 PUF |
|---|---|---|---|---|
| strength, g | 237 | 132 | 233 | 290 |

The invention claimed is:

1. A method of making an acoustic product, the method comprising:
   - providing an acoustic element comprising first and second major surfaces;
   - providing a first facing;
   - fixing the first facing to a first major surface of the acoustic element by the use of an adhesive; and
   - curing the adhesive, wherein the adhesive is an aqueous adhesive composition which is free of phenol and formaldehyde and comprises:
   - a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
   - a component (ii) in form of one or more cross-linkers.

2. The method according to claim 1, wherein the acoustic element is a man-made vitreous fibre (MMVF) panel.

3. The method according to claim 2, wherein the man-made vitreous fibre panel is formed of man-made vitreous fibres that are bonded by a cured binder wherein the binder before curing is a composition which is free of phenol and formaldehyde and comprises:
   - a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
   - a component (ii) in form of one or more cross-linkers.

4. The method according to claim 1, wherein the first facing is a glass fibre veil.

5. The method according to claim 1, wherein the first facing has two major surfaces and the method comprises applying adhesive to a major surface of the first facing and then applying said major surface of the first facing to a first major surface of the acoustic element.

6. The method according to claim 5, comprising applying the adhesive by use of rollers.

7. The method according to claim 1, wherein the step of curing the adhesive is carried out at a temperature of from 100 to 300° C., preferably 170 to 270° C., preferably 180 to 250° C., preferably 190 to 230° C.

8. The method according to claim 1, wherein the acoustic element has a density in the range of 40 to 180 kg/$m^3$, such as 80 to 160 kg/$m^3$, preferably 100 to 140 kg/$m^3$.

9. The method according to claim 1, wherein the loss on ignition (LOI) of the acoustic element is within the range of 2 to 8 wt %, preferably 3 to 5 wt %.

10. The method according to claim 1, comprising fixing a second facing to the second major surface of the acoustic element.

11. The method according to claim 10, comprising cutting the cured element in a plane substantially parallel to the major surfaces and smoothing each cut surface by abrasion to form two acoustic products.

12. The method according to claim 1, wherein the acoustic product has a thickness in the range of 12 to 100 mm, such as 15 to 50 mm.

13. The method according to claim 1, wherein the acoustic product has a width in the range of 550 to 650 mm, preferably around 600 mm.

14. The method according to claim 1, wherein the acoustic product has a length in the range of 550 to 650 mm or 1100 to 1300 mm, preferably around 600 mm, preferably around 1200 mm.

15. The method according to claim 1, comprising applying the adhesive in an amount of 5 to 12 g/$m^2$ dry.

16. The method according to claim 1, wherein the acoustic product is a ceiling panel.

17. The method according to claim 1, wherein the acoustic product is a wall panel.

18. The method according to claim 1, wherein the acoustic product is a baffle.

19. An acoustic product obtained by the method according to claim 1.

20. An acoustic product comprising an acoustic element comprising first and second major surfaces and a first facing, wherein the first facing is fixed to the first major surface of the acoustic element by an adhesive, wherein the adhesive composition is free of phenol and formaldehyde and comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

21. A suspended ceiling system comprising a plurality of acoustic products according to claim 19 suspended in a grid.

22. A wall system comprising a plurality of acoustic products according to claim 19 suspended on a wall.

23. An acoustic product according to claim 20, the aqueous adhesive composition further comprising a component (iii) in form of one or more plasticizers.

24. An acoustic product according to claim 20, wherein component (i) is having a carboxylic acid group content of 0.05 to 0.6 mmol/g, based on the dry weight of lignosulfonate lignins.

25. An acoustic product according to claim 20, wherein component (i) is in form of one or more lignosulfonate lignins having an average carboxylic acid group content of less than 1.8 groups per macromolecule considering the M_n wt. average of component (i), such as less than 1.4, such as less than 1.1, such as less than 0.7, such as less than 0.4.

26. An acoustic product according to claim 20, wherein component (i) is having a content of phenolic OH groups of 0.3 to 2.5 mmol/g, such as 0.5 to 2.0 mmol/g, such as 0.5 to 1.5 mmol/g. based on the dry weight of lignosulfonate lignins.

27. An acoustic product according to claim 20, wherein component (i) is having a content of aliphatic OH groups of 1.0 to 8.0 mmol/g, such as 1.5 to 6.0 mmol/g, such as 2.0 to 5.0 mmol/g, based on the dry weight of lignosulfonate lignins.

28. An acoustic product according to claim 20, wherein the component (i) comprises ammoniumlignosulfonates and/or calciumlignosulfonates, and/or magnesiumlignosulfonates, and any combinations thereof.

29. An acoustic product according to claim 20, wherein component (i) comprises ammoniumlignosulfonates and calciumlignosulfonates, wherein the molar ratio of $NH_4^+$ to $Ca^{2+}$ is in the range of 5:1 to 1:5, in particular 3:1 to 1:3.

30. An acoustic product according to claim 20, wherein the aqueous adhesive composition contains added sugar in an amount of 0 to less than 5 wt.-%, based on the weight of lignosulfonate and sugar.

31. An acoustic product according to claim 20, wherein the aqueous adhesive composition comprises component (i) in an amount of 50 to 98 wt.-%, such as 65 to 98 wt.-%, such as 80 to 98 wt.-%, based on the dry weight of components (i) and (ii).

32. An acoustic product according to claim 20, wherein the component (ii) is in form of one or more cross-linkers selected from a. β-hydroxyalkylamide-cross-linkers, and/or
b. oxazoline-cross-linkers, and/or
c. the group consisting of multifunctional organic amines such as an alkanolamine, diamines, such as hexamethyldiamine, and/or
d. epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or
e. one or more cross-linkers selected from the group consisting of fatty amines; and/or
f. one more cross-linkers in form of fatty amides; and/or
g. one or more cross-linkers selected from polyester polyols, such as polycaprolactone; and/or
h. one or more cross-linkers selected from the group consisting of starch, modified starch, CMC; and/or
i. One or more cross-linkers in form of multifunctional carbodiimides, such as aliphatic multifunctional carbodiimides; and/or
j. one or more cross-linkers selected from melamine based cross-linkers, such as a hexakis(methylmethoxy)melamine (HMMM) based cross-linkers.

33. An acoustic product according to claim 20, wherein the component (ii) comprises one or more cross-linkers selected from β-hydroxyalkylamide-cross-linkers and/or oxazoline-cross-linkers.

34. An acoustic product according to claim 20, the binder composition comprising component (ii) in an amount of 1 to 50 wt.-%, such as 4 to 20 wt.-%, such as 6 to 12 wt.-%, based on the dry weight of component (i).

35. An acoustic product according to claim 20, wherein the component (ii) is in form of one or more cross-linkers selected from a. β-hydroxyalkylamide-cross-linkers, such as N-(2-hydroxyisopropyl)amide-cross-linkers, such as N-(2-hydroxyethyl)amide-cross-linkers, such as N-(2-hydroxyethyl) adipamide-cross-linkers, such as N,N,N',N'-tetrakis(2-hydroxyethyl) adipamide and/or b. the group consisting of multifunctional organic amines such as an alkanolamine, diamines, such as hexamethyldiamine, and/or c. epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or d. one or more cross-linkers in form of multifunctional carbodiimides, such as aliphatic multifunctional carbodiimides.

36. An acoustic product according to claim 20, wherein the component (ii) comprises one or more cross-linkers selected from a. β-hydroxyalkylamide-cross-linkers, such as N-(2-hydroxyisopropyl)amide-cross-linkers, such as N-(2-hydroxyethyl)amide-cross-linkers, such as N-(2-hydroxyethyl) adipamide-cross-linkers, such as N,N,N',N'-tetrakis(2-hydroxyethyl) adipamide.

37. An acoustic product according to claim 20, the adhesive composition comprising component (ii) in an amount of 2 to 90 wt.-%, such as 6 to 60 wt.-%, such as 10 to 40 wt.-%, such as 25 to 40 wt.-%, based on the dry weight of component (i).

38. An acoustic product according to claim 23, wherein component (iii) is in form of one or more plasticizers selected from the group consisting of fatty alcohols, monohydroxy alcohols, such as pentanol, stearyl alcohol; and/or one or more plasticizers selected from the group consisting of alkoxylates such as ethoxylates, such as butanol ethoxylates, such as butoxytriglycol; and/or one or more plasticizers in form of propylene glycols; and/or one or more plasticizers in form of glycol esters; and/or one or more plasticizers selected from the group consisting of adipates, acetates, benzoates, cyclobenzoates, citrates, stearates, sorbates, sebacates, azelates, butyrates, valerates; and/or one or more plasticizers selected from the group consisting of phenol derivatives, such as alkyl or aryl substituted phenols; and/or one or more plasticizers selected from the group consisting of silanols, siloxanes; and/or one or more plasticizers selected from the group consisting of sulfates such as alkyl sulfates, sulfonates such as alkyl aryl sulfonates such as alkyl sulfonates, phosphates such as tripolyphosphates; and/or one or more plasticizers in form of hydroxy acids; and/or one or more plasticizers selected from the group consisting of monomeric amides, such as acetamides, benzamide, fatty acid amides such as tall oil amides; and/or one or more plasticizers selected from the group consisting of quaternary ammonium compounds such as trimethylglycine, distearyldimethylammoniumchloride; and/or one or more plasticizers selected from the group consisting of vegetable oils such as castor oil, palm oil, linseed oil, soybean oil; and/or tall oil, and/or one or more plasticizers selected from the group consisting of hydrogenated oils, acetylated oils; and/or one or more plasticizers selected from acid methyl esters; and/or one or more plasticizers selected from the group consisting of alkyl polyglucosides, gluconamides, aminoglucoseamides, sucrose esters, sorbitan esters; and/or one or more plasticizers selected from the group consisting of polyethylene glycols, polyethylene glycol ethers; and/or one or more plasticizers in form of polyols, such as glycerol, such as 1,1,1-Tris(hydroxymethyl)propane; and/or triethanolamine.

39. An acoustic product according to claim 23, wherein component (iii) is in form of propylene glycols, phenol derivatives, silanols, siloxanes, hydroxy acids, vegetable oils, polyethylene glycols, polyethylene glycol ethers, triethanolamine, or any mixtures thereof.

40. An acoustic product according to claim 23, wherein component (iii) comprises one or more plasticizers having a boiling point of 100 to 380° C., more preferred 120 to 300° C., more preferred 140 to 250° C.

41. An acoustic product according to claim 23, wherein component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

42. An acoustic product according to claim 23, wherein the component (iii) is present in the binder composition in an amount of 0.5 to 60, preferably 2.5 to 25, more preferably 3 to 15 wt.-%, based on the dry weight of component (i).

43. An acoustic product according to claim 20, the adhesive composition comprising a further component (iv) in form of one or more coupling agents, such as organofunctional silanes.

44. An acoustic product according to claim 20, the adhesive composition further comprising a component (v) in form of one or more components selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof.

45. An acoustic product according to claim 20, the adhesive composition comprising a further component in form of urea, in particular in an amount 5 to 40 wt.-%, such as 10 to 30 wt.-%, such as 15 to 25 wt.-%, based on the dry weight of component (i).

46. An acoustic product according to claim 20, wherein the acoustic element further comprises a further component (vi) in the form of one or more reactive or nonreactive silicones.

47. An acoustic product according to claim 20, wherein the acoustic element does not contain an ammonia-oxidized lignin (AOL).

48. An acoustic product according to claim 2 with the proviso that the aqueous composition does not comprise a cross-linker selected from carbonyl compounds selected from aldehydes, carbonyl compounds of the formula R—[C(O)$R_1$]$_x$ i. in which:

ii. R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, iii. $R_1$ represents a hydrogen atom or a $C_1$-$C_{10}$ alkyl radical, and iv. x varies from 1 to 10.

49. An acoustic product according to claim 20 with the proviso that the aqueous composition does not comprise a cross-linker selected from polyamines.

50. An acoustic product according to claim 20 with the proviso that the aqueous composition does not comprise a cross-linker selected from:

epoxy compounds having a molecular weight Mw of 500 or less.

* * * * *